(12) United States Patent
Desruelle et al.

(10) Patent No.: US 9,134,450 B2
(45) Date of Patent: Sep. 15, 2015

(54) COLD ATOM GRAVITY GRADIOMETER

(71) Applicant: MUQUANS, Talence (FR)

(72) Inventors: Bruno Desruelle, Pessac (FR); Philippe Bouyer, Talence (FR); Arnaud Landragin, Paris (FR)

(73) Assignee: MUQUANS, Talence (FR)

( * ) Notice: Subject to any disclaimer, the term of this patent is extended or adjusted under 35 U.S.C. 154(b) by 209 days.

(21) Appl. No.: 13/735,743

(22) Filed: Jan. 7, 2013

(65) Prior Publication Data
US 2014/0190254 A1 Jul. 10, 2014

(51) Int. Cl.
*G01V 7/14* (2006.01)
*G01V 7/04* (2006.01)

(52) U.S. Cl.
CPC ... *G01V 7/04* (2013.01); *G01V 7/14* (2013.01)

(58) Field of Classification Search
CPC .................................. G01V 7/14; G01V 7/04
USPC ......... 73/382 G, 382 R; 324/244.1, 301, 304; 250/251
See application file for complete search history.

(56) References Cited

U.S. PATENT DOCUMENTS

| | | | |
|---|---|---|---|
| 3,688,584 A | | 9/1972 | Stone et al. |
| 4,454,482 A * | | 6/1984 | DeMarchi ........................ 331/3 |
| 4,874,942 A * | | 10/1989 | Clauser ........................ 250/251 |
| 5,233,462 A | | 8/1993 | Wong |
| 5,274,231 A | | 12/1993 | Chu et al. |
| 5,274,232 A | | 12/1993 | Chu et al. |
| 5,338,930 A | | 8/1994 | Chu et al. |
| 5,528,028 A * | | 6/1996 | Chu et al. ..................... 250/251 |
| 6,303,928 B1 | | 10/2001 | Buell et al. |
| 6,303,938 B1 * | | 10/2001 | Weinsdorfer et al. ..... 250/559.27 |
| 6,314,809 B1 * | | 11/2001 | Kasevich et al. ........... 73/382 R |
| 6,548,809 B2 | | 4/2003 | Bouyer et al. |
| 6,635,867 B2 | | 10/2003 | Kajita |
| 7,038,450 B2 * | | 5/2006 | Romalis et al. ............... 324/304 |
| 7,126,112 B2 | | 10/2006 | Anderson et al. |
| 7,142,983 B2 | | 11/2006 | Huddle |
| 7,317,184 B2 | | 1/2008 | Kasevich et al. |
| 7,323,941 B1 | | 1/2008 | Happer et al. |
| 7,359,059 B2 | | 4/2008 | Lust et al. |
| 7,439,814 B2 | | 10/2008 | Happer et al. |

(Continued)

FOREIGN PATENT DOCUMENTS

| | | |
|---|---|---|
| CN | 1333622 A | 1/2002 |
| CN | 1603984 A | 4/2005 |

(Continued)

OTHER PUBLICATIONS

Lim, Sang-Hyun et al.; "Single-Pulse Phase-Control Interferometrc Coherent Anti-Stokes Raman Scattering Spectroscopy;" Physical Review A 72, 2005 (17 pages).

(Continued)

*Primary Examiner* — Helen Kwok
(74) *Attorney, Agent, or Firm* — Osha Liang LLP

(57) ABSTRACT

A cold atom gravity gradiometer system includes a laser source that generates a laser beam that propagates along a propagation direction. The system further includes a reflector that reflects a portion of the laser beam and transmits another portion of the laser beam (the transmitted portion). A second reflector spatially separated from the first reflector along the propagation direction reflects the transmitted portion of the laser beam.

23 Claims, 12 Drawing Sheets

(56) References Cited

U.S. PATENT DOCUMENTS

| | | | |
|---|---|---|---|
| 7,745,788 B2 * | 6/2010 | Appleyard et al. | 250/338.1 |
| 7,915,577 B2 | 3/2011 | Fatemi et al. | |
| 7,944,317 B2 | 5/2011 | Strabley et al. | |
| 7,954,375 B2 | 6/2011 | Zaugg | |
| 7,965,147 B2 | 6/2011 | Strabley et al. | |
| 7,978,334 B2 | 7/2011 | Schwartz et al. | |
| 8,054,074 B2 * | 11/2011 | Ichihara et al. | 324/304 |
| 8,299,419 B2 * | 10/2012 | Vestergaard Hau | 250/251 |
| 8,373,112 B2 * | 2/2013 | Bouyer et al. | 250/251 |
| 2005/0027489 A1 | 2/2005 | Kasevich et al. | |
| 2009/0242743 A1 | 10/2009 | Bouyer et al. | |
| 2010/0064767 A1 | 3/2010 | Rice et al. | |
| 2010/0147071 A1 | 6/2010 | Schwartz et al. | |
| 2010/0200739 A1 | 8/2010 | Anderson et al. | |
| 2010/0320995 A1 | 12/2010 | David et al. | |
| 2011/0073753 A1 | 3/2011 | Bouyer et al. | |
| 2011/0193555 A1 * | 8/2011 | Sugioka et al. | 324/244.1 |
| 2013/0127458 A1 * | 5/2013 | Mizutani et al. | 324/301 |
| 2013/0205894 A1 * | 8/2013 | Rothleitner | 73/382 R |
| 2014/0319329 A1 * | 10/2014 | Bidel et al. | 250/251 |

FOREIGN PATENT DOCUMENTS

| | | |
|---|---|---|
| CN | 1658095 A | 8/2005 |
| CN | 2757187 Y | 2/2006 |
| CN | 1784109 A | 6/2006 |
| CN | 1967145 A | 5/2007 |
| CN | 1333622 C | 8/2007 |
| CN | 200950173 Y | 9/2007 |
| CN | 201016734 Y | 2/2008 |
| CN | 100376123 C | 3/2008 |
| CN | 201118551 Y | 9/2008 |
| CN | 101425804 A | 5/2009 |
| CN | 100538269 C | 9/2009 |
| CN | 100589049 C | 2/2010 |
| EP | 1896796 A1 | 3/2008 |
| EP | 2154586 A2 | 2/2010 |
| FR | 2826446 A1 | 12/2002 |
| FR | 2848296 A1 | 6/2004 |
| FR | 2877430 A1 | 5/2006 |
| JP | 2010-103483 A | 5/2010 |
| WO | 2014106811 A2 | 7/2014 |

OTHER PUBLICATIONS

Lee, K.I. et al.; "Single-Bean Atop Trap in a Pyramidal and Conical Hollow Mirror;" Optics Letters, vol. 21, No. 15, Aug. 1, 1996; pp. 1171-1179.

McGuirk, J.M. et al.; "Sensitive Absolute-Gravity Gradiometry Using Atom Interferometry;" Physical Review A, vol. 65, Feb. 8, 2002; pp. 033608-1-033608-14.

Yu, N. et al.; "Development of an Atom-Interferometer Gravity Gradiometer for Gravity Measurement From Space;" Applied Physics B, Lasers and Optics, vol. 84, No. 4, Jul. 18, 2006; pp. 647-652.

Pollock, S et al.; "Integrated magneto-optical traps on a chip;" Optics Express, vol. 17, Issue 16, May 6, 2009 (3 pages).

Bertoldi, A et al.; "Atom interferometry gravity-gradiometer for the determination of the Newtonian gravitational constant G;" Eur. Phys. J. D, vol. 40, (2006) (9 pages).

Sorrentino, F et al.; "Simultaneous measurement of gravity acceleration and gravity gradient with an atom interferometer;" Applied Physics Letters 101, pp. 114106-1-114106-4 (2012).

Snadden, M.J. et al.; "Measurement of the Earth's Gravity Gradient with an Atom Interferometer-Based Gravity Gradiometer;" The American Physical Society, vol. 81, No. 5, Aug. 3, 1998; pp. 971-974.

Kasevich, Mark et al.; "Atomic Inerferometry Using Stimulated Raman Transitions," The American Physical Society, vol. 67, No. 2, Jul. 8, 1991 pp. 181-184.

Canuel, B et al.; "Six-Axis Inertial Sensor Using Cold-Atom Interferometry;" The American Physical Society, PRL 97, 010402, Jul. 7, 2006, pp. 010402-1-010402-4.

Yver-Leduc, Florence et al.; "Reaching the quantum noise limit in a high-sensitivity cold-atom inertial sensor;" Institute of Physics Publishing, J. Opt. B: Quantum Semiclass. Opt 5 (2003) pags S136-S142.

Peters, A et al.; "High-precision gravity measurements using atom interferometry" Metologia, 2001, 38, pp. 25-61.

McGuirk, J.M. (2001). High Precision Absolute Gravity Gradiometer with Atom Interferometry. (Doctoral dissertation) (183 pages).

International Search Report and Written Opinion issued in corresponding International Application No. PCT/IB2014/000340 dated Nov. 18, 2014, (12 pages).

Fixer, Jeffrey B; "Atom Interferometer-Based Gravity Gradiometer Measurements"; Ph.D Dissertation, XP055151493, retrieved online, http://search.proquest.com/docview/304714502; Yale University, New Haven, CT, Dec. 2003 (151 pages).

* cited by examiner

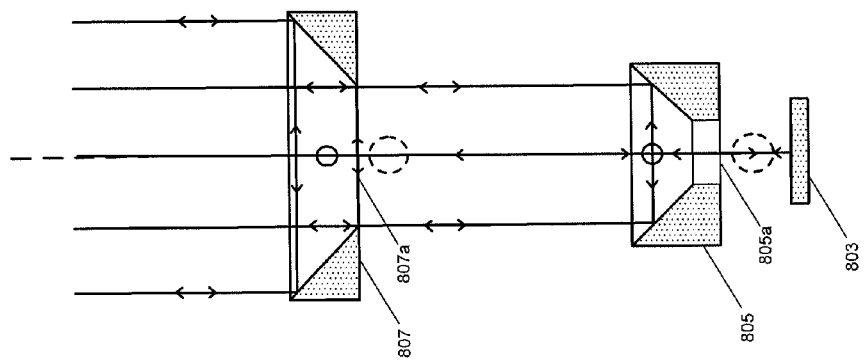
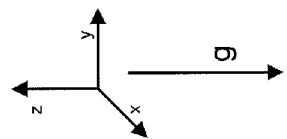
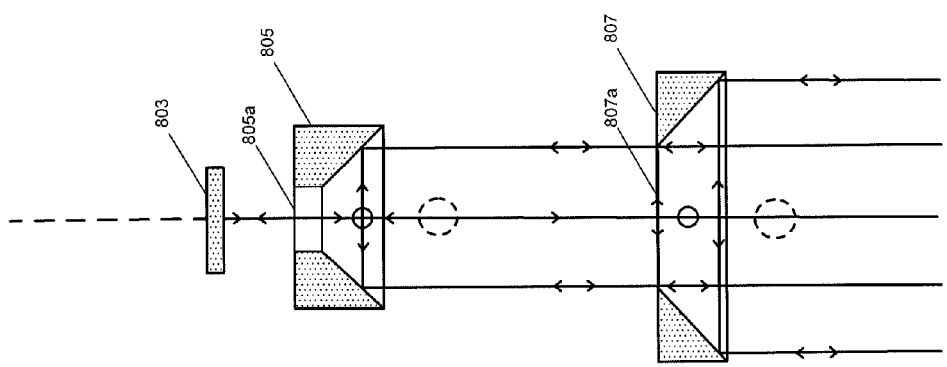
FIG. 8B
FIG. 8A

COLD ATOM GRAVITY GRADIOMETER

BACKGROUND

Precise gravity or acceleration measurements are important in a wide array of technological fields. For example in the field of inertial navigation, precisely measured acceleration as a function of time may be used to accurately track the trajectory of a moving body such as a ship or aircraft. However, when attempting to precisely measure a pure acceleration, care must be taken to ensure that the measurement is not skewed by a change in the local gravitational field. This is because local accelerations are physically indistinguishable from local gravitational fields. This equivalence, first appreciated by Albert Einstein, and now known as Einstein's equivalence principle plagues any inertial navigation system that requires high precision. However, inertial measurements may be improved through the of a gravity gradiometer to help determine if any large local mass anomalies, such as mountains, are perturbing the local gravitational field and thus systematically affecting the local acceleration measurement.

Precise maps of local gravitational fields may be used to identify subsurface anomalies such as hydrocarbon reservoir or sub-surface bunkers. Such subsurface structures or anomalies may be uniquely identified from a noisy signal by a characterization of their local gravity gradient signatures.

The gravitational force between any two masses is inversely proportional to the square of the distance between them. Furthermore, the local gravity gradient is defined to be the change in the local gravitational field as a function of distance along the measurement axis of the gradiometer. As shown in FIG. 1A, the local gravitational field generated by the Earth presents a natural gradient along the z axis. To determine a local gravity gradient along the z-direction, e.g., to determine the local gravity gradient of the Earth, two local gravity measurements must be made, for example at a distance z apart. FIG. 1A shows the result of two such measurement denoted by $g_{z1}$ and $g_{z2}$. The one dimensional gravity gradient $$\frac{\partial g_z}{\partial z}$$

is determined by subtracting the two measurements and dividing by the distance between them:

$$\frac{\partial g_z}{\partial z} = \frac{g_{z2} - g_{z1}}{z}$$

Gravity gradient measurements, being inherently differential measurements, are superior to simple acceleration/gravity measurements in noisy systems, especially where common mode noise may be effectively eliminated through the differencing procedure.

Local gravity, or equivalently, local acceleration may be measured in various ways. For example, cold atom interferometers may be used to measure the local acceleration. FIG. 1B shows an example of a known cold atom gradiometer for measuring the local acceleration experienced by pair of cold atom samples. The acceleration measurement is accomplished by exposing a sample of cold atoms to a sequence of optical pulses to cause the atoms to split and travel along two legs of an interferometer, not too dissimilar from what occurs in an optical interferometer. In the optical case, the light is best understood as an electromagnetic wave, while in the case of cold atoms, atoms are best understood as a matter-waves with wavelengths given by $\lambda = h/p$, where the wavelength $\lambda$ of the matter wave is inversely proportional to the momentum of the atom and h is Plank's constant. Such a matter wave interferometer based on cold atoms is disclosed in M. J. Snadden, J. M. McGuirk, P. Bouyer, K. G. Haritos, and M. A. Kasevich, "Measurement of the Earth's Gravity Gradient with an Atom Interferometer-Based Gravity Gradiometer" Physical Review Letters 81, 971 (1998), a portion of which is summarized below in reference to FIG. 1B.

The apparatus of FIG. 1B includes two samples of cold atoms that are trapped and cooled in two separate magneto-optical traps. The magneto optical traps are formed from a frequency stabilized trapping laser beam 119 that is slightly red detuned from a cycling transition in the cloud of cold atoms. Typically, a complex optical system is required to generate the 12 trapping laser beams from the single trapping laser beam 119. The system (not shown) typically requires several beam splitters, mirrors, and polarization elements to generate six pairs of counter propagating trapping laser beams (shown in the drawing as arrows converging at the cold atom samples 106 and 104). The magnetic traps are separated spatially within separate vacuum chambers (not shown). The acceleration measurements are made using a ($\pi/2$-$\pi$-$\pi/2$) pulse sequence of stimulated two-photon Raman laser pulses. The two-photon Raman pulses drive the state of the atoms to oscillate in time between two atomic ground-state hyperfine levels, phenomena known as Rabi oscillations. As is known in the art, the three pulse ($\pi/2$-$\pi$-$\pi/2$) sequence results in an atom interferometer if the two Raman laser beams counter-propagate. In the system shown in FIG. 1B, the counter-propagating Raman laser beams are generated from a dual frequency beam 103 that propagates in free space to the polarizing beam splitter 105. The beams are then spilt by the polarizing beam splitter 105 with the beam having the first frequency $\omega_1$ propagating straight through beam splitting cube 105 and, therefore, immediately through both clouds of cold atoms. The beam having the second frequency $\omega_2$ is reflected off of beam splitter 105 and beam splitter 107 and then propagates parallel to the first beam to the mirrors 109 and 110 that redirect the second beam through the two clouds of cold atoms in a direction opposite to the propagation direction of the first beam.

The relative acceleration along the direction of the Raman beams of the two cold atom samples are measured by subtracting two atomic phase shifts that are measured using the two atom interferometers at each of the two locations 101 and 103. The atomic phase shifts are derived quantities that are obtained from the measured atom population in the ground state. (As described below, the number of atoms found in the ground state after the Raman pulse varies sinusoidally with the phase difference introduced in one leg of the interferometer due to, e.g., gravitational acceleration or rotation about an axis perpendicular to the plane of the interferometer.) The measured atom population is determined by way of resonance fluorescence. More specifically, a probe beam 117 tuned to resonance with a cycling transition is briefly pulsed on the atoms. Typically the probe beam 117 is a different beam from the Raman beam and is introduced into the system by way of beam splitter 107. Like Raman beam 103, the probe beam 117 is redirected by mirrors 109 and 110 so as to overlap the cold atom samples 106 and 104. The resulting fluorescence from the atoms is picked up by detectors 113 and 115. Using known and validated physical models, the number of atoms in the ground state may then be inferred from the amount of detected fluorescence.

As alluded to above, the number of atoms present in the ground state depends on the measured phase between the interferometer legs and may be found using the relation $p=[1-\cos \Delta\phi(r)]/2$, where P is the probability of an atom to be in the ground state as a function of the acceleration induced phase shift. For atoms accelerating at a rate g(r), $\Delta\phi(r)=(\vec{k}_1-\vec{k}_2)\cdot \vec{g}(r)T^2$, where T is the time between successive Raman beam pulses, and $\vec{k}_1$ and $\vec{k}_2$ are the propagation vectors for the Raman beams of frequency $\omega_1$ and $\omega_2$, respectively. Thus, by measuring the ground state populations, the phase difference $\Delta\phi(r)$, and thereby the projection of g(r) on the measurement axis may be determined. Furthermore, the acceleration gradient can then be determined by dividing the relative acceleration by the distance between the two locations where the acceleration measurements are made.

In view of the above, the gravity gradiometer shown in FIG. 1B is fairly complex. As can be seen in the Figure, several different laser sources are needed to create the 12 magneto-optical beams, the two Raman laser beams, and the fluorescence probe. Furthermore, the system described in FIG. 1B requires each magneto-optical trap to be housed in a separate vacuum chamber 121 and 123.

In addition, an example of inertial measurements based on cold atom interferometry is disclosed in U.S. patent application Ser. No. 12/921,519 ("the '519 application"). The interferometer of the '519 application is based on a magneto-optical trap that uses a single pyramidal retro-reflector for absolute acceleration/gravity measurements. The system of the '519 application cannot measure gravity gradients and is additionally sensitive to vibrational noise in the single pyramidal retro-reflector. Due to the equivalence principle any vibrational noise shows up as noise that is indistinguishable from the gravity signal.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with the embodiments described below, a cold atom gravity gradiometer is disclosed herein that performs multiple (i.e., two or more) relative acceleration (or, equivalently, local gravity) measurements using a single laser beam. More precisely, in accordance with one or more embodiments, the single laser beam may be reflected by two or more reflectors to form the atom traps, and the same laser beam may be used both to form the atom interferometers, and to make the population measurements. Accordingly, the complexity of the optical system may be greatly reduced. Likewise, the difficulty of optical alignment and complexity of the manufacturing process are both dramatically simplified because only a few optics are needed to be precisely aligned, namely, the reflectors which serve to create the magneto-optical traps and the retro-reflector which serves to create the retro-reflected Raman beam (as described below, the retro-reflector may, or may not, be part of, or integrated into, a pyramidal reflector depending on the embodiment deployed). Furthermore, due to the use of a series of reflectors all the beams for each successive magneto-optical trap are generated from a single laser beam. Stated another way, the generation 6N trapping beams from a single laser beam requires only N reflectors. Furthermore, the same laser beam may be used for the Raman beam, the trapping laser beam, and the fluorescence detection beam.

In general, in one aspect, one or more embodiments of the present invention are directed to a cold atom gravity gradiometer system. The system includes a laser source for generating a laser beam that propagates along a propagation direction, a first reflector and a second reflector. The first reflector reflects a first portion of the laser beam and transmits a second portion of the laser beam. The second reflector is spatially separated from the first reflector along the propagation direction and the second reflector reflects the second portion of the laser beam.

In general, in one aspect, one or more embodiments of the present invention are directed to a cold atom gravity gradiometer system. The cold atom gravity gradiometer system includes a laser source for generating a laser beam that propagates along a propagation direction, a first reflector, and a second reflector. The first reflector reflects a first portion of the laser beam. The second reflector reflects a second portion of the laser beam. The second reflector is spatially separated from the first reflector along a gradient measurement direction that substantially perpendicular to the propagation direction.

In general in one aspect, one or more embodiments of the invention are directed to a method for measuring a gravity gradient. The method includes generating a laser beam having a first detuning, reflecting, from a first reflector, a first portion of the laser beam to generate a plurality of first trapping laser beams and transmitting a second portion of the laser beam through a central hole arranged in the first reflector. The method further includes reflecting, from a second reflector, the second portion of the laser beam to generate a plurality of second trapping laser beams and a retro-reflected trapping laser beam, forming a first cold atom trap using the plurality of first trapping laser beams in combination with the retro-reflected trapping laser beam, and forming a second cold atom trap using the plurality of second trapping laser beams in combination with the retro-reflected trapping laser beam. The method further includes trapping a first sample and a second sample of cold atoms in the first and second cold atom traps, respectively.

In general, in one aspect, one or more embodiments of the invention are directed to a method for measuring a gravity gradient. The method includes generating a laser beam having a first detuning, reflecting, from a first reflector, a first portion of the laser beam to generate a plurality of first trapping laser beams, and transmitting a second portion of the laser beam through a central hole arranged in the first reflector. The method further includes reflecting, from a second reflector, the second portion of the laser beam to generate a plurality of second trapping laser beams and transmitting a third portion of the laser beam through a central hole arranged in the second reflector. The method further includes reflecting, from a third reflector, the third portion of the laser beam to generate a plurality of third trapping laser beams and a retro-reflected trapping laser beam. A first cold atom trap is formed using the plurality of first trapping laser beams in combination with the retro-reflected trapping laser beam. A second cold atom trap is formed using the plurality of second trapping laser beams in combination with the retro-reflected trapping laser beam. A third cold atom trap is formed using the plurality of third trapping laser beams in combination with the retro-reflected trapping laser beam. The method further includes trapping a first sample, a second sample, and a third sample of cold atoms in the first, second, and third cold atom traps, respectively.

Other aspects and advantages of the invention will be apparent from the following description and the appended claims.

BRIEF DESCRIPTION OF DRAWINGS

FIGS. 8A-8B show examples of a cold atom gravity gradiometers in accordance with one or more embodiments if the invention.

DETAILED DESCRIPTION

Figure 1A:
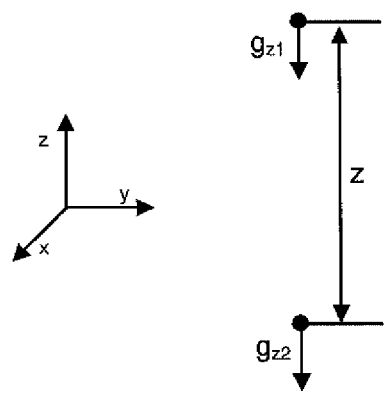
FIGS. 1A-1B illustrate the principle of gravity gradiometry and show an example of a cold atom interferometer, respectively.

Specific embodiments of a cold atom gravity gradiometer will be described in detail with reference to the accompanying figures. Like elements in the various figures (also referred to as Figs.) are denoted by like reference numerals for consistency.

In the following detailed description of embodiments, numerous specific details are set forth in order to provide a more thorough understanding of the cold atom gravity gradiometer. However, it will be apparent to one of ordinary skill in the art that these embodiments may be practiced without these specific details. In other instances, well-known features have not been described in detail to avoid unnecessarily complicating the description.

In general, embodiments of the invention relate to a system for measuring a gravity or acceleration gradient at a location in space. More specifically, the cold atom gravity gradiometer uses cold atom interferometric methods to measure the local acceleration experienced by at least two cold atom samples and uses these local acceleration measurements to compute the acceleration (or gravity) gradient or acceleration (or gravity) curvature at the spatial location. Furthermore, reflectors internal to the cold-atom sensor are configured such that a single Raman laser beam may be used to measure both samples simultaneously, or nearly simultaneously.

The cold atom gravity gradiometer may be deployed for gravity or acceleration measurement in vibrationally noisy environments such as those associate within the fields of geophysics and inertial navigation. However, the cold atom gravity gradiometer may be deployed in any situation where a measurement of the local acceleration or the local acceleration gradient is deemed to be of value.

Generally speaking, the structure described below detailing the cold atom gravity gradiometer in accordance with one or more embodiments is versatile and may be deployed with many different techniques for trapping and cooling atoms and with many different techniques for cold atom interferometry. Accordingly, where specific mention is made of one or more known atom cooling and/or atom interferometric techniques, these techniques are set forth as merely examples of such techniques that may be used with the cold atom gravity gradiometer in accordance with one or more embodiments. Accordingly, the present invention is not limited to only the specific examples atom trapping and interferometric techniques disclosed herein. Rather embodiments of the cold atom gravity gradiometer may be deployed using any known technique for atom trapping and cooling and/or cold atom interferometry.

Figure 2:
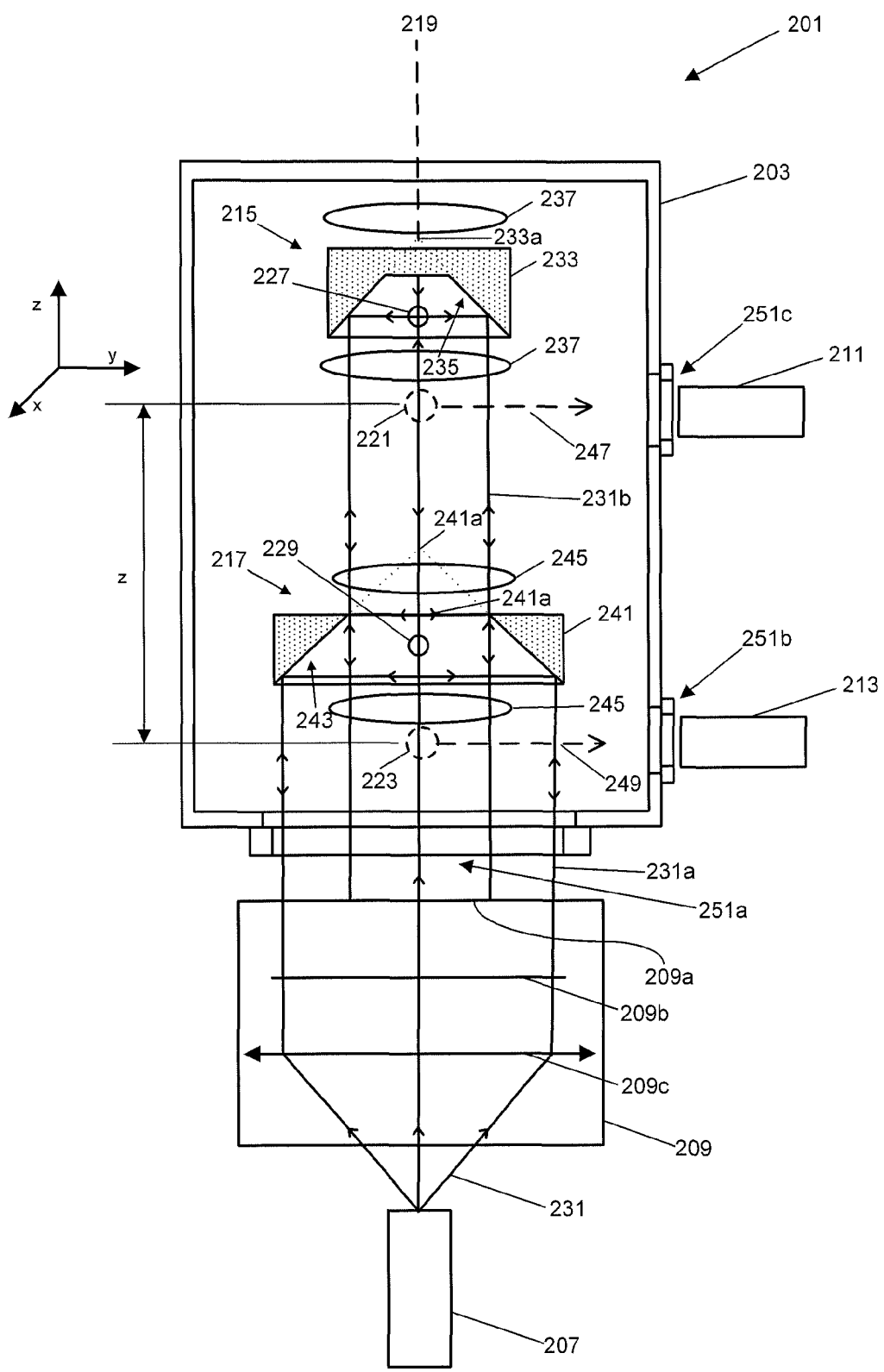
FIG. 2 shows an example of a cold atom gravity gradiometer system in accordance with one or more embodiments of the invention.

FIG. 2 shows an example of a cold atom gradiometer system in accordance with one or more embodiments of the invention. The cold atom gradiometer system 201 includes vacuum chamber or vessel 203, a laser source 207, optical system 209, and detectors 211 and 213. Housed within the vessel 203 are two cold atom interferometers 215 and 217. Furthermore, the cold atom interferometers are configured to measure the local acceleration at two points 221 and 223 along the measurement direction 219. The local gravity gradient along the measurement direction 219 may then be determined by subtracting the local accelerations measured by the two cold atom interferometers and dividing the difference by the distance z between the two points 221 and 223.

Optical system 209 includes any optical components necessary to shape laser beam 231 and, if necessary, to create a circularly polarized beam from the linearly polarized output of laser source 207. For example, optical system 209 may include telescope 209c (drawn here as a single lens for simplicity) and quarter wave plate 209b. One of ordinary skill will appreciate that the precise optics needed to shape laser beam 231 may vary depending on the design constraints of the system. For example, the numerical aperture and focal length of expanding telescopes are determined by the required output size of the beams and input size of the beams as received from the respective laser source 207. Furthermore, the type of optic may also depend on the intensity of the beams, the frequency of the beams, or the respective output polarization of the laser source 207. Furthermore, in accordance with one or more embodiments, a spatial filter may be used to engineer the intensity distribution of the laser beam 231. For example, a spatial filter (not shown) may be employed within optical system 209 that creates an output laser beam 231a having a "flat-topped" or "top hat" intensity distribution as opposed to the more typical Gaussian intensity distribution of a single mode laser.

Figure 12:
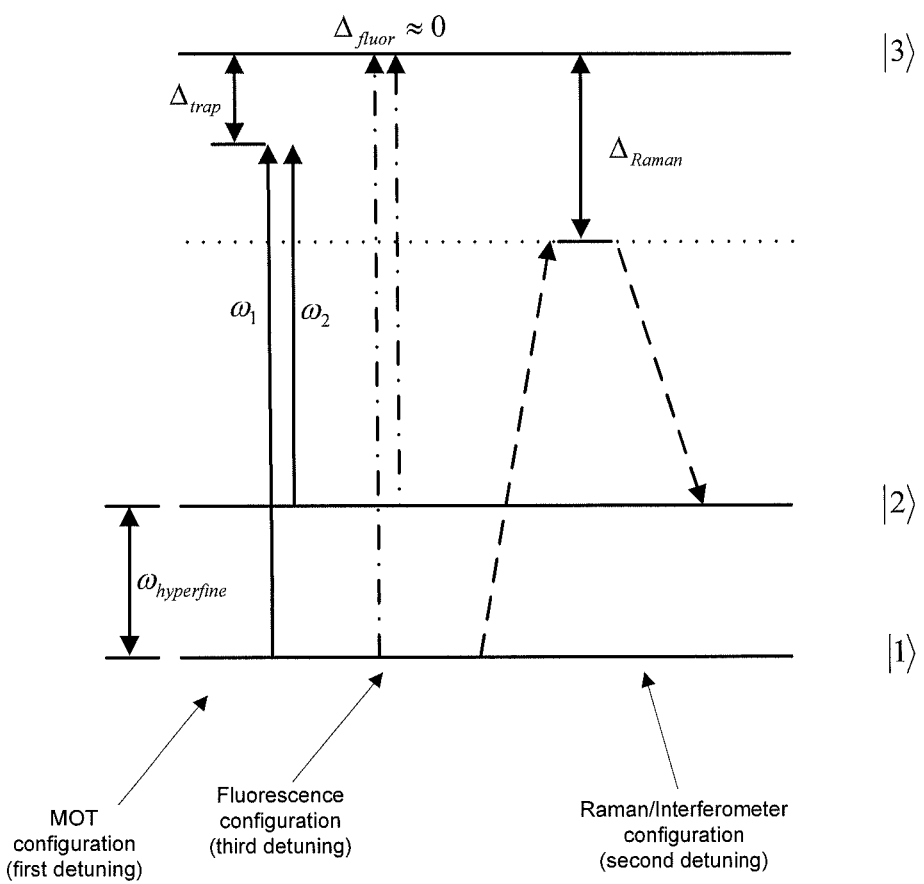
FIG. 12 shows an energy level diagram describing laser detunings in accordance with one or more embodiments of the invention.

Laser source 207 is a laser system that generates a laser beam 231 that includes the necessary frequencies for magneto-optically trapping a sample of cold atoms, e.g., cold atoms 227 and 229, the necessary frequencies for driving Raman transitions in the samples of cold atoms, and the necessary frequencies for driving a cycling transition for fluorescence based population measurements in the samples of cold atoms. FIG. 12 shows an example of the frequencies necessary for accomplishing all the above tasks for a hypothetical three level atomic system, which is commonly used to model the electronic structure of the alkali atoms used for cold atom interferometry. Accordingly, laser source 207 is a frequency stabilized multi-frequency laser having a tunable frequency between a first detuning, a second detuning, and a third detuning for trapping and cooling, driving Raman transitions (interferometry), and fluorescence (population measurement) detection, respectively, as described in more detail below. Furthermore, laser source 207 may switch between a dual frequency, frequency stabilized state for magneto-optical trapping, and a dual frequency phase locked state for driving the Raman transitions. More specifically, in accordance with one or more embodiments, in the Raman configuration, the laser beam 231 is comprised of a pair of phase locked laser beams whose frequencies are separated by the ground state hyperfine splitting of the atom being trapped. In accordance with one or more embodiments, the two frequencies are slaved in phase such that the phase error induced during the measurement time is less than one radian.

Figure 1B:
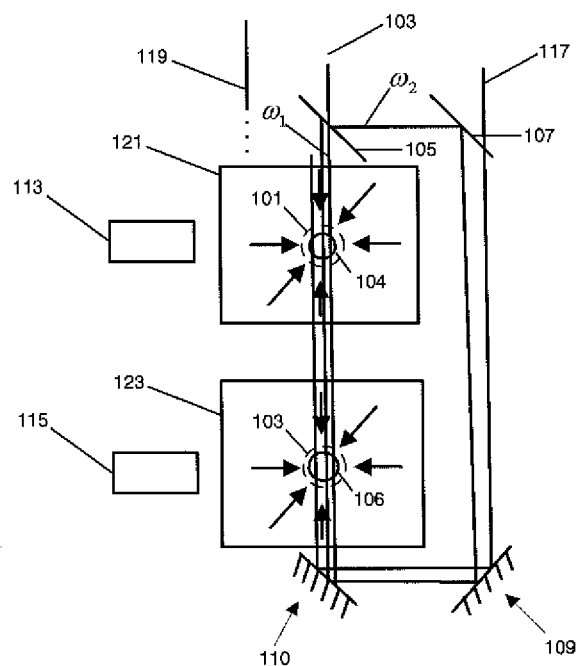

During an interferometer sequence, the laser beam 231 may be pulsed in a number of different directional and temporal configurations. In accordance with one or more embodiments, the beam is pulsed in a ($\pi/2$-$\pi$-$\pi/2$) three-pulse sequence as described above in reference to FIG. 1B. One of ordinary skill will appreciate that many different types of pulse sequences may be used to generate cold atom interferometers of varying geometry without departing from the scope of the present disclosure. For example, B. Canuel et al., "Six Axis Inertial Sensor Using Cold-Atom Interferometry" Physical Review Letters 97, 010402 (2006) discloses the use of a four-pulse sequence of ($\pi/2$-$\pi$-$\pi$-$\pi/2$) in order to create what is known as a "butterfly" interferometer.

One of ordinary skill will appreciate that many different types of atoms may be trapped using laser beam 231 and that, depending on the particular type of atom being trapped, the frequencies present in laser beam 231 may vary. For example, for trapping Rubidium-87 ($^{87}$Rb), the laser beam 231 may be a dual frequency laser beam including two frequencies tuned near an atomic cycling transition (or near a resonance line more generally) with the two frequencies being separated by the ground state hyperfine splitting of approximately $\omega_{hyperfine}$=6,800 MHz. Further, different atoms possess different ground state hyperfine splittings and, thus, the precise frequency separation between the two frequencies in the laser beam 231 will depend on the atomic species being trapped.

Once laser beam 231 has been shaped and properly polarized, it is directed toward entrance viewport 251a of the vessel 203. In accordance with one or more embodiments, the vessel 203 may be a metallic vacuum chamber, e.g., a chamber formed from titanium, stainless steel, aluminum, or the like. In addition, the vessel may be fabricated as is known in the art and also may include several ports having conflat flanges for attachment of various pieces of equipment, including viewports (e.g., viewports 251a, 251b, and 251c), various gauges, pumps, or other diagnostic equipment (not shown). Many different types of vacuum chambers, or vessels may be used without departing from the scope of the present invention, including, e.g., glass cell vessels.

Furthermore, the vessel 203 may be coupled to an atom source (not shown) for providing a source of dilute atomic vapor. For example, the atom source may include a reservoir of atomic material in the solid, e.g., metallic phase. In accordance with one or more embodiments, the solid is heated and temperature controlled so as to emit atoms in the vapor (gas) phase into the vessel 203 for trapping and cooling by the magneto-optical traps of the cold atom interferometers 215 and 217. In another example, the atomic vapor may be generated by light induced atomic desorption (LIAD), e.g., by irradiating a solid source of atoms with ultra-violet light. One of ordinary skill will appreciate that many different types of atomic sources may be employed without departing from the scope of the present disclosure.

Inside the vessel 203 are housed a pair of cold atom interferometers 215 and 217. Cold atom interferometer 215 includes a reflector 233 (shown in FIG. 2 in cross-section) that is positioned along measurement direction 219 and having a reflecting surface 235 that substantially faces the entrance viewport 251a of the vessel 203. In accordance with one or more embodiments, the reflecting surface 235 is of a truncated pyramidal shape so as to generate a set of trapping laser beams and to retro-reflect the portion 231b of the laser beam 231 that is incident on the reflecting surface 235. In interferometer 215, a magneto-optical trap is formed by the combination of the portion 231b of the laser beam 231 that has been reflected from the reflecting surface 235 and the magnetic gradient field generated by electromagnet coil pair 237. More specifically, the portion 231b of the trapping laser beam 231 that reaches reflecting surface 235 is reflected from each of the five reflecting surfaces of the truncated pyramidal shape of reflecting surface 235, as described in more detail below in reference to FIG. 3.

Cold atom interferometer 217 includes a reflector 241 (shown in FIG. 2 in cross-section) that is positioned along measurement direction 219 and has a reflecting surface 243 substantially facing entrance viewport 251a of the vessel 203. Thus, in accordance with one or more embodiments, measurement direction 219 is the line connecting the apparent apex 233a of the reflector 233 with the apparent apex 241a of truncated pyramidal reflector 241. In accordance with one or more embodiments, the reflecting surface 243 is of a truncated pyramidal shape so as to retro-reflect portion 231a of the laser beam 231 that is incident on the reflecting surface 243. In interferometer 217, six counter-propagating atom trapping laser beams are formed by the combination of the portion 231a of the laser beam 231 that has been reflected from the reflecting surface 243 and the retro-reflected portion 231b of the laser beam 231 that is reflected from the top surface 235a of reflecting surface 235.

Furthermore, the action of the trapping laser beams in combination with the magnetic gradient generated by electromagnet coil pair 245 forms a magneto-optical trap. More specifically, the portion 231a of the laser beam 231 that reaches reflecting surface 243 undergoes multiple reflections due to the truncated pyramidal shape of reflecting surface 243. Furthermore, in accordance with one or more embodiments, the portion 231b of the laser beam 231 passes through a central hole 241a of the reflector 241. It is this portion 231b of the trapping laser beam 225 that is used for generating the trapping laser beams for magneto-optical trapping at reflector 233. Thus, in accordance with one or more embodiments of the invention, only a single laser beam 231 is needed to generate all the 12 of the magneto-optical trapping beams for both of the interferometers 215 and 217.

More generally, the reflecting surfaces of the reflectors may have a generally concave shape so that the incident laser beams, e.g., 231a or 231b and their reflections on the faces of the reflectors make it possible to capture the atoms in the volume of the reflectors. In accordance with one or more embodiments, the reflecting surface of a reflector 233 may have a conical, pyramidal, truncated conical, or truncated pyramidal shape (also known as frustoconical and frustopyramidal, respectively), without departing from the scope of the present disclosure. In accordance with one or more embodiments, a reflector can have a pyramidal shape with a square or truncated pyramidal cross section so that incident laser beams, e.g., 231b, and its retro-reflection make it possible to capture the atoms in the volume of the reflector 233.

In accordance with one or more embodiments, a reflector may be arranged so that the retro-reflected laser beam (e.g., portions 231a and 231b that have reflected off of their respective reflectors and, thus, counter propagate back through the system) has an identical polarization to the polarization of the laser beams 231a, 231b, thereby facilitating the obtaining atomic interferometer measurement. To do this, the reflector may have a frustoconical or truncated pyramidal shape with a flat surface perpendicular to the direction of the incident laser beam and the flat surface has received an appropriate dielectric coating so the retro-reflected laser beam has a polarization identical to the polarization of the incident laser beam.

Figure 3:
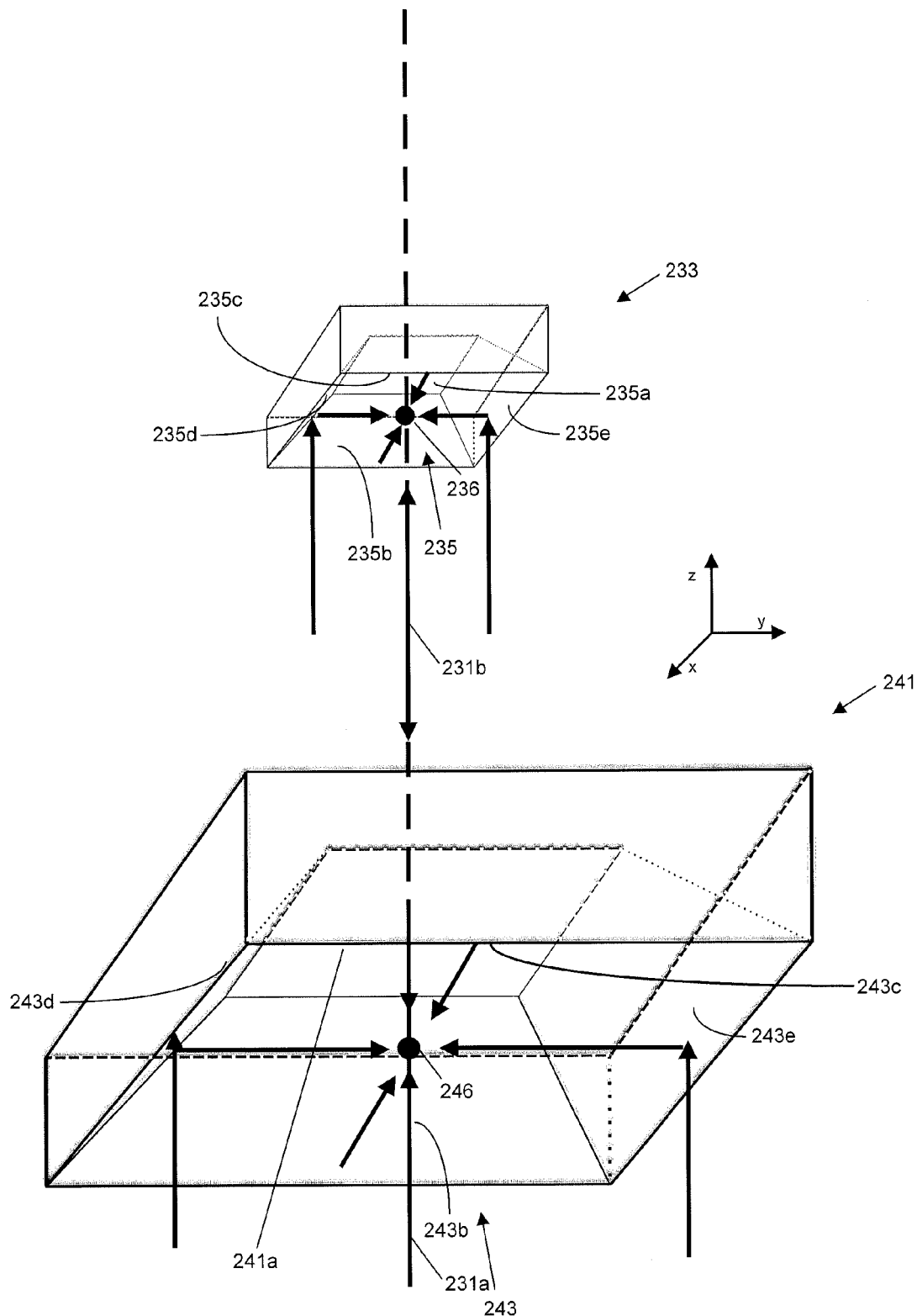
FIG. 3 shows an example of a 1D reflector configuration of a cold atom gravity gradiometer system in accordance with one or more embodiments if the invention.

FIG. 3 shows a perspective view example of such a reflector. The reflector 233 has a reflective surface 235 with a generally truncated pyramidal shape. More specifically, reflecting surface 235 includes opposing faces 235b and 235c and two other opposing faces 235d and 235e. In addition, reflective surface 235 includes retro-reflecting surface 235a. Thus, the reflecting surface 235 generates two pairs of counter-propagating trapping laser beams in the x-y plane that intersect in the trapping region 236. Furthermore portion 231b of laser beam 231 is retro-reflected by the retro-reflecting surface 235a to create a pair of counter-propagating trapping laser beams in the z-direction. Accordingly, the cold atoms are magneto-optically trapped in the trapping region 236 and the reflector 233 serves to generate the necessary trapping laser beams to capture the atoms within the volume of the truncated pyramidal reflector. Furthermore, the reflector 233 also serves to generate a retro-reflected Raman laser beam by retro-reflecting portion 231b of laser beam 231 at the retro-reflecting surface 235a when the detuning of the laser beam is set to drive Raman transitions as detailed below in reference to FIGS. 9-11.

The reflecting surface 243 of the reflector 241 may have a generally concave shape with a central hole so that the incident laser beams, e.g., 231a, their reflections on the faces 243a, 243c, 243d, 243e of the reflectors and the retro-reflected beam 231b, retro-reflected from reflecting surface 236 make it possible to capture the atoms in the volume of the reflectors. In accordance with one or more embodiments, the reflecting surface of a reflector may have a truncated pyramidal shape with a square cross section.

FIG. 3 shows a perspective view of the reflector 241 having a reflective surface 243 having a generally truncated pyramidal shape with a central hole therethrough. More specifically, reflecting surface 243 includes opposing faces 243b and 243c and two other opposing faces 243d and 243e. Thus, the reflecting surface 243 generates two pairs of counter-propagating trapping laser beams in the x-y plane that intersect in the trapping region 246, where the cold atoms are magneto-optically trapped. Thus, the reflector 241 serves to generate 4 of the six necessary laser beams to capture the atoms within the volume of the truncated pyramidal reflector. Furthermore, the fifth beam is created when the portion 231b of the laser beam (that has been transmitted through central hole 241a) is retro-reflected from the surface 235a of reflector 233. The sixth beam is the portion 231a itself.

Advantageously, employing a truncated pyramidal reflector 241 having a central hole 241a therethrough in series with a reflector 233 allows for the generation of two spatially separated magneto-optical traps using only one incident laser beam 231. In accordance with one or more embodiments, these two magneto-optical traps are used to generate two sources of cold atoms to be used in two spatially separated local acceleration measurements using atom interferometry methods based on two-photon Raman transitions, as is known in the art and described above in reference to FIG. 1B.

In accordance with one or more embodiments, the two reflectors 233 and 241 may be rigidly mounted within the vessel 203. For example, the reflectors may be mounted to conflat flanges that are themselves mounted to access ports within the vacuum chamber.

Returning to FIG. 2, the actual local acceleration measurement are made according to the following procedure. First, the cold atom sample 227 and the cold atom sample 229 are created by their corresponding magneto-optical traps, as described above. Then, the laser beam and gradient coils are switched off and both cold atom samples undergo free-fall for a predetermined time. After the predetermined time has elapsed, the cold atom samples 227 and 229 have fallen to positions 221 and 223, respectively. Then, the frequency of the laser beam 231 is changed to a second detuning for driving two-photon Raman transitions. The laser beam 231 is then pulsed to generate the two cold atom interferometers at positions 221 and 223. For example, the two counter-propagating Raman beams, generated from the laser beam 231 and the reflection of the portion 231b from reflector 233 intersect both atom clouds. Accordingly, the Raman pulse sequence serves to simultaneously, or substantially simultaneously, create the two, spatially separated, cold atom interferometers.

After the interferometry pulse sequence is finished, both cold atom samples are interrogated to measure the number and/or fraction of atoms from the original cold atom sample that are in one or more ground state sublevels, thereby allowing the computation of the local acceleration experienced by each cold atom cloud during the interferometry sequence, as is known in the art. In accordance with one or more embodiments, the ground state population may be measured by detecting the fluorescence 249 and 247 emitted by the cold atom samples after being irradiated by the laser beam 231 after the frequency of the laser beam 231 is changed to a third detuning to drive a cycling transition in the cold atoms. More specifically, the third detuning of the laser beam 231 is nearly zero so that the laser beam 231 is tuned to be resonant, or nearly resonant, with a cycling transition of the cold atoms being trapped. For example, the frequency of the probe laser beam may be tuned to the $5^2S_{1/2}F=2 \rightarrow 5^2P_{3/2}F'=3$ transition when $^{87}$Rb atoms are used as the trapped atom. In accordance with one or more embodiments, the fluorescence is measured by detectors 211 and 213. Detectors 211 and 213 may be any photo detector known in the art, including, e.g., photodiodes, digital cameras based on CMOS or CCD technology, as well as photomultipliers, or the like.

Once of ordinary skill will appreciate that any known Raman pulse sequence may be used to generate the cold atom interferometer and that any known computational method may be used to compute the local acceleration at each cold atom sample based on the fluorescence signal without departing from the scope of the present disclosure. For example, the ($\pi/2$-$\pi$-$\pi/2$) three Raman pulse sequence described above in reference to FIG. 1 above may be used.

While laser source 207 is simplistically described above as a single laser source, one of ordinary skill will appreciate that this multi-frequency laser may be generated in any number of ways without departing from the scope of the present disclosure. For example, two or more separate lasers may be slaved together and their output beams spatially overlapped to generate the multi-frequency laser source. In addition, acousto-optic or electro-optic modulators may be used to generate multiple frequencies from a single source; or current modulation may be used to generate multiple frequencies in a solid state laser. Accordingly, the laser source 207 is not limited to a single laser but is intended to schematically represent any known laser source having multiple frequencies.

Figure 4:
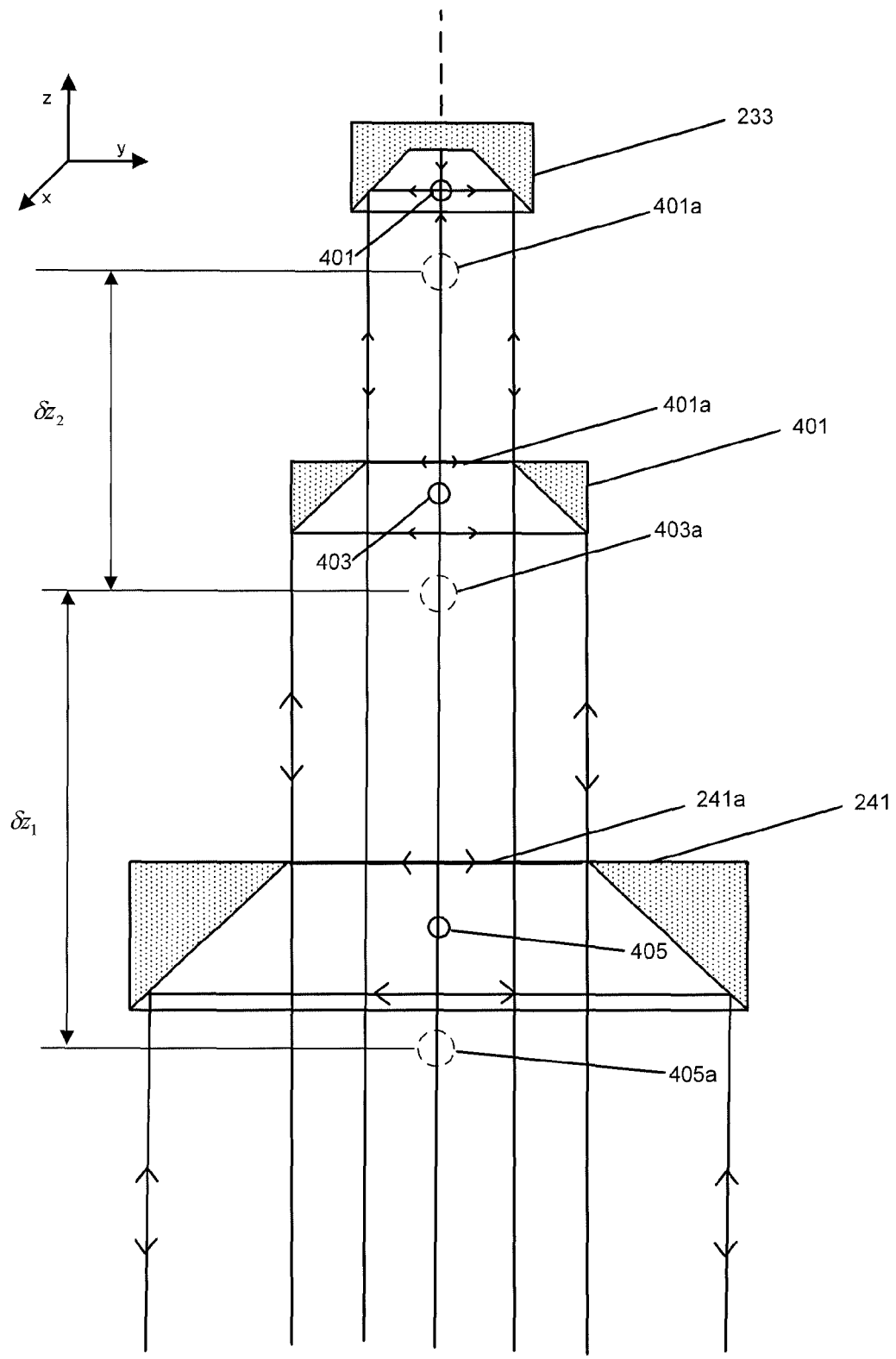
FIG. 4 shows an example of a 1D reflector configuration of a cold atom gravity gradiometer for measuring local gravity curvature in accordance with one or more embodiments if the invention.

FIG. 4 shows an example of a cold atom gravity gradiometer in accordance with one or more embodiments of the invention. More specifically, FIG. 4 shows a reflector architecture that may be used to measure the vertical gravity gradient in addition to the second order derivative of the vertical gravity gradient (or the curvature of the local gravity field). The primary difference between the configuration shown here and that shown in FIG. 2 is that a second truncated pyramidal reflector 401 having a central hole 401*a* is interposed between the reflector 233 and the truncated pyramidal reflector 241 having central hole 241*a*. Accordingly, three spatially separated local acceleration measurements may be made using the same single laser beam configuration described above in reference to FIG. 2. More precisely, the vertical acceleration along the measurement direction experienced by each cold atom sample 401, 403, 405 may be measured using atom interferometric techniques, as described above. Accordingly, after release and free-fall, the gravity gradient between cold atom samples 401*a* and 403*a*, between 401*a* and 405*a*, and/or between 403*a* and 405*a* may be determined. The computed gravity gradients may then be subtracted to obtain the gravity curvature. While three reflectors are shown in FIG. 4, one of ordinary skill will appreciate that any number of reflectors may be used without departing from the scope of the present disclosure.

The gravity gradient is actually a tensor quantity given by $$g_{gradient} = \begin{pmatrix} \frac{\partial g_x}{\partial x} & \frac{\partial g_x}{\partial y} & \frac{\partial g_x}{\partial z} \\ \frac{\partial g_y}{\partial x} & \frac{\partial g_y}{\partial y} & \frac{\partial g_y}{\partial z} \\ \frac{\partial g_z}{\partial x} & \frac{\partial g_z}{\partial y} & \frac{\partial g_z}{\partial z} \end{pmatrix}$$

In what is described above, the gravity gradient is measured along a direction that is parallel to the local gravity direction (i.e., the direction of free-fall of the cold atom clouds). Accordingly, the devices described above are useful for a 1-D gradient measurement, e.g., for a measurement of $$\frac{\partial g_z}{\partial z}.$$

Figure 5:
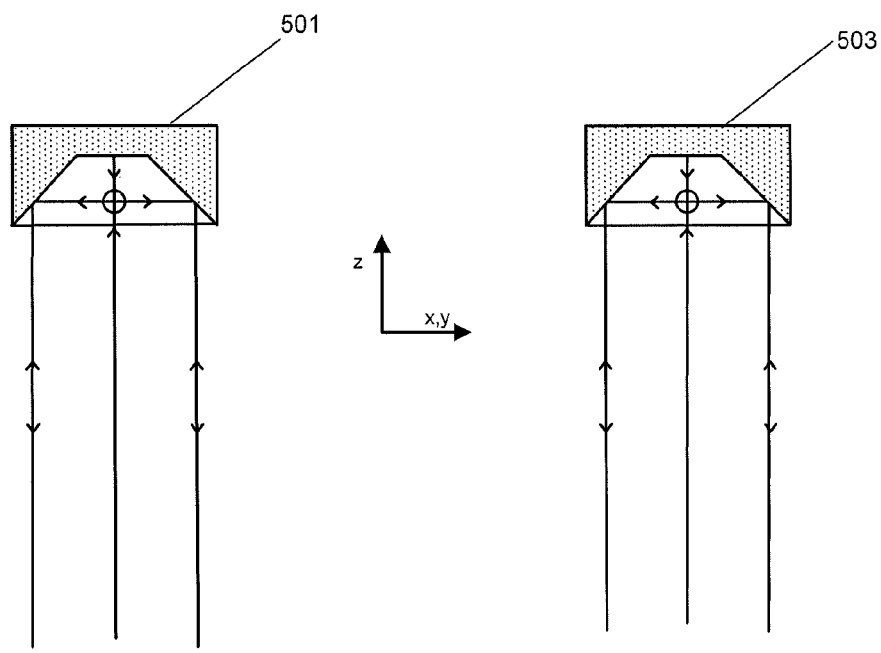
FIG. 5 shows an example of a 1D reflector configuration of a cold atom gravity gradiometer in accordance with one or more embodiments if the invention.

However, the cold atom gravity gradiometer in accordance with one or more embodiments is not so limited. In accordance with other embodiments, individual reflectors may be arranged to measure any component of the gravity gradient without departing from the scope of the present disclosure. For example, as shown in FIG. 5, two reflectors 501 and 503 may be arranged to be spatially separated in the x or y directions, i.e., along any direction that is substantially perpendicular to the local gravity (or local free fall) direction. Such device would allow the measurement of $$\frac{\partial g_z}{\partial x}$$

and/or $$\frac{\partial g_z}{\partial y}.$$

Figure 6:
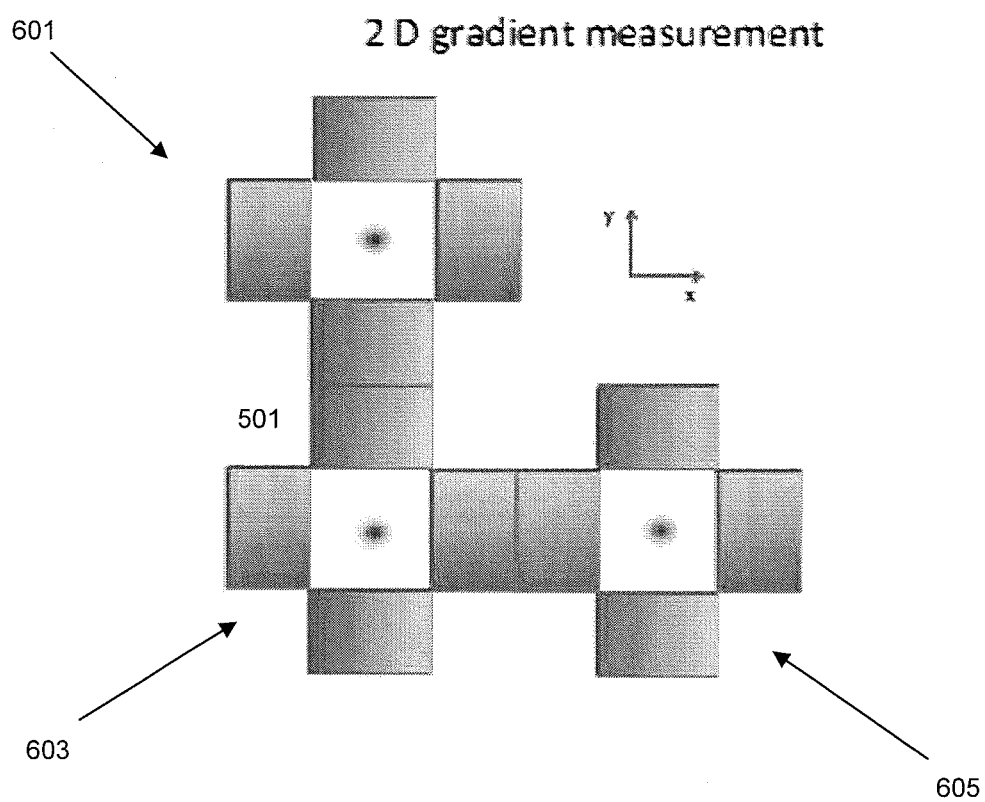
FIG. 6 shows an example of a cold atom gravity gradiometer in accordance with one or more embodiments if the invention.

Furthermore, a 2D gravity gradient measurement may be made by configuring the reflectors as shown in FIG. 6. In FIG. 6, three reflectors 601, 603, and 605 are arranged in the x-y plane, thus allowing access to both $$\frac{\partial g_z}{\partial x}$$

and $$\frac{\partial g_z}{\partial y}.$$

Furthermore, if one or more of the reflectors shown in FIG. 6 includes a two reflector configuration in the z-direction as described above in FIG. 2 (i.e., one or more reflectors coming out of the page in line with one or more of the reflectors shown in FIG. 6) the value $$\frac{\partial g_z}{\partial z}$$

is also accessible.

Figure 7:
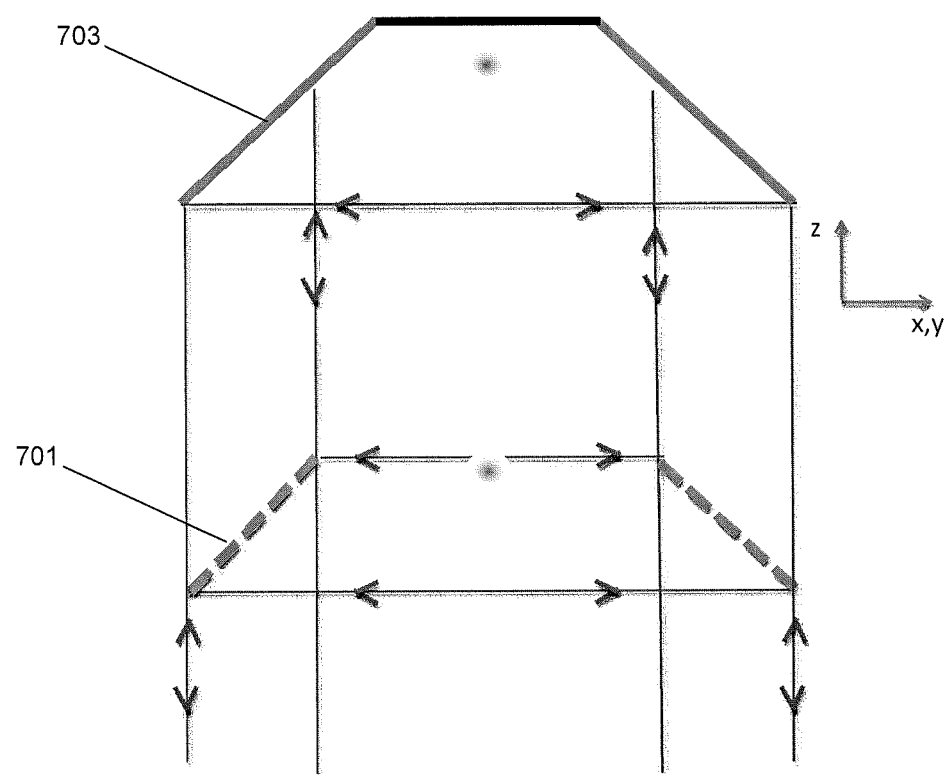
FIG. 7 shows an example of a cold atom gravity gradiometer in accordance with one or more embodiments if the invention.

FIG. 7 shows a configuration of reflectors in accordance with one or more embodiments of the invention. More specifically, FIG. 7 shows a configuration that is very similar to that shown in FIGS. 2-3. However, in this case, the truncated pyramidal reflector 701 if formed of a partially reflecting material. Thus, a larger portion of the trapping laser beam is transmitted to the truncated pyramidal reflector 703 as compared to the example shown in FIGS. 2-3. Accordingly, a larger pyramidal reflector 703 may be used. Furthermore, the partially reflective configuration shown in FIG. 7 allows for better symmetry in the system architecture since the capture volumes are identical in both trapping regions.

FIGS. 8A-8B show two possible configurations of reflectors in accordance with one or more embodiments if the invention. More specifically, FIGS. 8A-8B show reflector architectures that may be used to measure the gravity gradient in accordance with one or more embodiments. The reflector arrangements shown in FIGS. 8A-8B are nearly identical to that described in FIG. 2 above and accordingly, repeated elements will not be described here for the sake of compactness. However, the architecture of FIG. 8 employs a different retro-reflecting mirror 803 that is separate and distinct from the truncated pyramidal reflector 805. This retro-reflecting mirror may be receive a dielectric coating so that the retro-reflected laser beam has a polarization identical to the polarization of the incident laser beam. Alternatively, a quarter wave plate may be used so that the retro-reflected laser beam has a polarization identical to the polarization of the incident laser beam. Accordingly, not only does the first reflector 807 have a central hole 807*a* for transmitting a portion of the laser beam therethrough, but the second reflector 805 also has a central hole 805*a* for transmitting a second portion of the laser beam therethrough. Thus, in this embodiment, the portion of the laser beam that is retro-reflected from retro-reflecting mirror 803 is used as one of the axial trapping beams and as the counter-propagating Raman beam. This alternative arrangement offers the possibility to obtain a better wavefront quality for the retro-reflected beam, which is a critical parameter for the instrument performance. Also it offers a greater flexibility in the positioning of all the optics and vacuum elements. Further, as shown in FIG. 8A-8B, the device may be positioned parallel or anti-parallel to the local gravitational field and still avoid the drawback that the free-falling cold atomic samples might collide with the reflecting surfaces of reflectors 807 and 805. To the contrary, the free falling atomic samples may fall through the central holes 805a and 807a.

Figure 9:
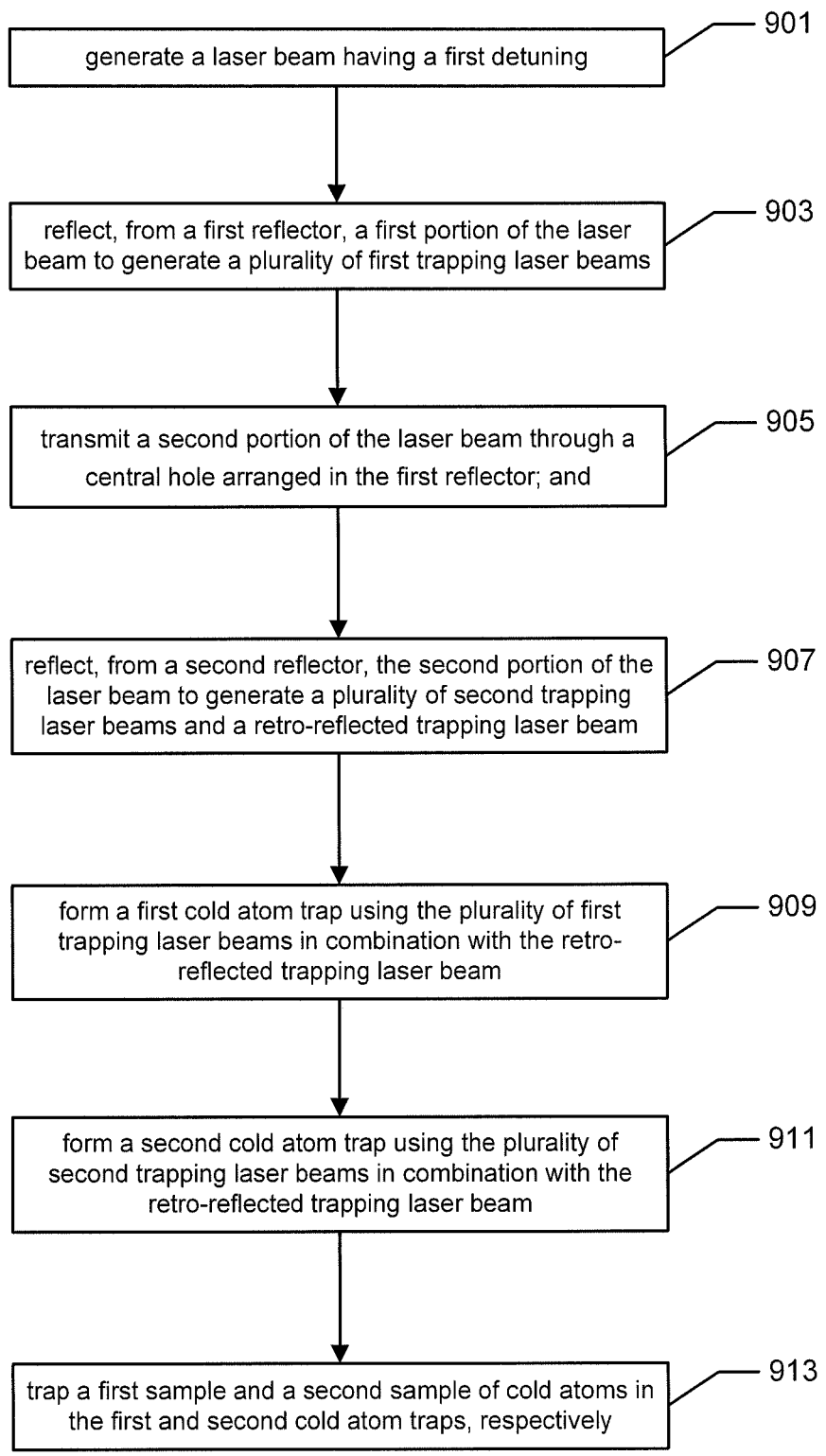
FIG. 9 shows a flow chart describing a method in accordance with one or more embodiments if the invention.
Figure 10:
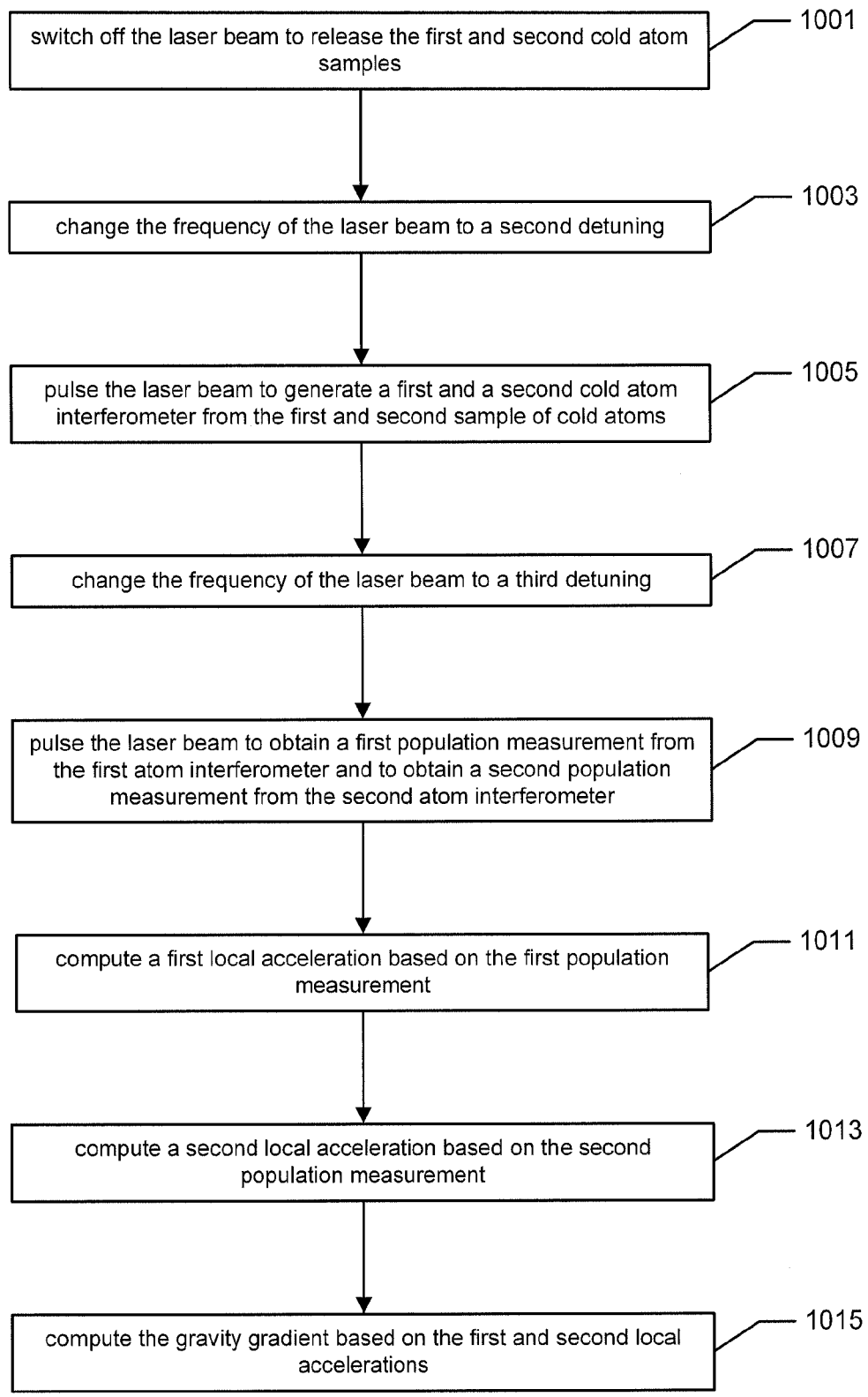
FIG. 10 shows a flow chart describing a method in accordance with one or more embodiments if the invention.
Figure 11:
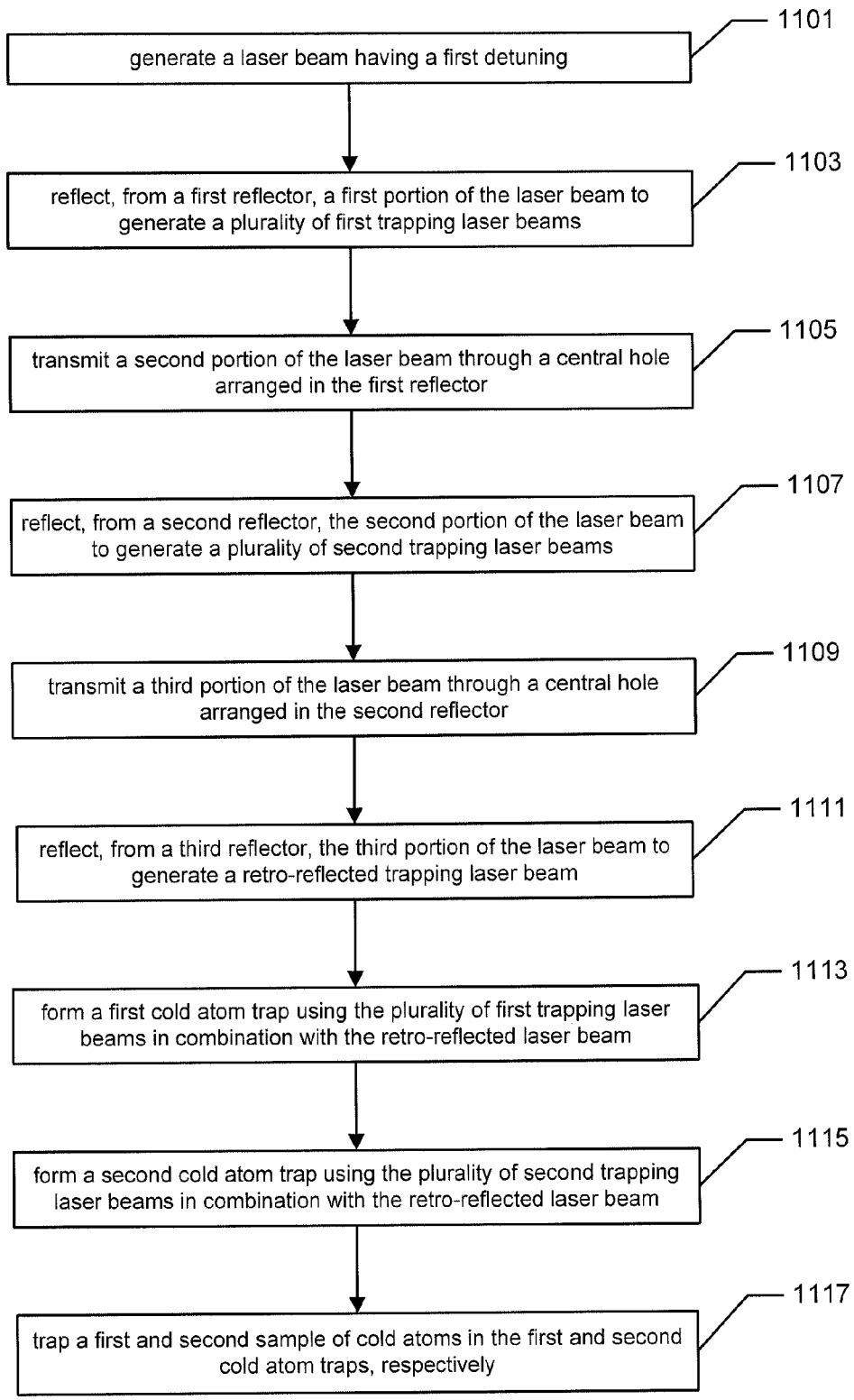
FIG. 11 shows a flow chart describing a method in accordance with one or more embodiments if the invention.

FIGS. 9-11 show flow charts representing methods for measuring a gravity gradient in accordance with one or more embodiments of the invention. While the steps laid out below are described in sequential order, the steps need not be executed necessarily in the particular sequence, or temporal order shown. For example, in accordance with one or more embodiments, forming the first and second cold atom traps requires no more time than that required for the laser beam to propagate through the optical system. In most circumstances this propagation time is negligible and the traps may be understood to be formed simultaneously, or substantially simultaneously. In other embodiments, control over the current in the electromagnetic coils of the magneto-optical traps, e.g., coils 237 and 235, allow for the two traps to be loaded at any time, one at a time, in any temporal sequence or simultaneously, as described above.

Furthermore, in the methods laid out below, well known steps are not necessarily described in detail. For example, one of ordinary skill will appreciate that before the local acceleration measurement using atomic interferometer is performed, the as many of the atoms of the atomic sample as possible should be pumped into the same internal state. To accomplish this, well known methods of optical molasses and optical pumping are typically performed after the magneto-optical trap stage but before the interferometer stage. For example, the sample of atoms may first be optically pumped into the F=2 state. Then a magnetic bias field is applied and, using an electromagnetic pulse, atoms are transferred from the F=2, $m_F$=0 to the F=1, $m_F$=0 state. Finally any atoms remaining in any of the F=2 $m_F$ sublevels are blasted away with a laser pulse that is detuned to the blue of the atomic transition, wherein the detuning is 1-2 times the natural linewidth. Accordingly, after this procedure only the atoms in F=1, $m_F$=0 state remain. One of ordinary skill will appreciate that many different methods exist for preparing a state selected sample of atoms and thus the present invention is not limited to the example description laid out above.

FIG. 9 shows flow chart for a cold atom trapping method for use in a method for measuring a gravity gradient in accordance with one or more embodiments of the invention. In step 901, a laser beam is generated that has a first detuning. The laser beam may be generated in accordance with any known method in the art, for example, by frequency locking a solid state laser to a vapor cell or the like. Accordingly, one or more embodiments of the present invention are not limited to a particular type of laser source nor a particular method of frequency stabilization. Furthermore, as used herein the detuning of a laser beam is defined to be the difference between the frequency of the laser beam and the frequency of a reference atomic transition. For example, in accordance with one or more embodiments, the laser detuning may be set so as to effectively trap and cool atoms in a trapping region of a reflector, as described above in reference to FIG. 2.

For example, in accordance with one or more embodiments, $^{87}$Rb may be used as the trapped atomic species. Accordingly, in this example, the cycling transition used to reference all laser detunings may be the $5^2S_{1/2}$F=2→$5^2P_{3/2}$F'=3 atomic transition. Using the energy level diagram in FIG. 12 as an example, the $5^2S_{1/2}$F=2 ground state is represented by the |2⟩ state and the first detuning is represented by the frequency difference $\Delta_{trap}$. One of ordinary skill will appreciate that due to the ground state hyperfine structure, the $5^2S_{1/2}$F=2→$5^2P_{3/2}$F'=3 transition is not a perfect cycling transition. Accordingly, laser beams used for trapping $^{87}$Rb are dual frequency, with the first frequency detuned from the $5^2S_{1/2}$F=2→$5^2P_{3/2}$F'=3 transition and the second frequency detuned from the $5^2S_{1/2}$F=1→$5^2P_{3/2}$F'=2 transition. Using the energy level diagram in FIG. 12 as an example, the $^2S_{1/2}$F=1 ground state is represented by the state |1⟩. In this diagram, the hyperfine splitting of the excited $^2P_{3/2}$ state is neglected for simplicity. In practice this splitting is small compared to the ground state splitting.

In addition, the detuning $\Delta_{trap}$ of each frequency of the dual frequency laser is shown to be equal in FIG. 12. However, the detunings may be different without departing from the scope of the present disclosure. Accordingly, the term detuning is used herein to include one or more detunings of a multi-frequency laser beam, wherein one or more of the detunings may be equal, as shown on FIG. 12, or not equal as the case may be. Furthermore, while the example of $^{87}$Rb is used herein, any atom may be used without departing from the scope of the present disclosure. One of ordinary skill will appreciate that the atomic species will determine the laser beam frequency in addition to the number of different frequencies that will need to be present in the generated laser beam. One of ordinary skill will also appreciate that the exact value of the detuning $\Delta_{trap}$ is not precisely fixed for all applications but is chosen depending on the desired properties of the cold atom sample, e.g., temperature, density, total number, etc. In most situations the detuning $\Delta_{trap}$ may be set to be on the order of the natural linewidth of the atomic transition being driven, e.g., in the range of 0.1-20 times the natural linewidth. In accordance with one or more embodiments, the detuning for an optimal trapping of the atoms is around 2 times the natural linewidth.

Returning to FIG. 9, in step 903, a first portion of the laser beam having the first detuning is reflected from a first reflector to generate a plurality of first trapping laser beams, as shown and described above, e.g., in reference to FIGS. 2-4 and 7-8, wherein an example of the first reflector is shown as reflector 241. Other examples of the first reflector include reflector 501 and reflector 601, as shown in FIGS. 5 and 6, respectively. In step 905, a second portion of the laser beam is transmitted through a central hole in the first reflector, e.g., as shown in FIGS. 1-8. In accordance with one or more embodiments, in addition to transmitting the second portion of the laser beam through a central hole in the reflector, the second portion may also be transmitted through the reflecting surface of the reflector itself. In other words, the first reflector may be partially reflective as is shown by reflector 701 of FIG. 7.

In step 907, the second portion of the laser beam is reflected from a second reflector to generate a plurality of second trapping laser beams and a retro-reflected trapping laser beam. Examples of the second reflector operating to generate a plurality of second trapping laser beams and a retro-reflected trapping laser beam is shown and described above in reference to FIGS. 2, 3 and 7.

In step 909, a first cold atom trap is formed using a combination of the plurality of first trapping laser beams and the retro-reflected trapping laser beam. For example, as described above in reference to FIG. 2, the plurality of first trapping laser beams and the retro-reflected trapping laser beam may form three pairs of counter-propagating laser beams for generating a first magneto-optical trap.

In step 911, a second cold atom trap is formed using a combination of the plurality of second trapping laser beams and the retro-reflected trapping laser beam. For example, as described above in reference to FIG. 2, the plurality of second trapping laser beams and the retro-reflected trapping laser beam may form three pairs of counter-propagating laser beams for generating a second magneto-optical trap.

In step 913, first and second samples of cold atoms are trapped in the first and second cold atom traps, e.g., in the magneto-optical traps of the cold atom interferometers 215 and 217, as shown in FIG. 2. Other examples of first and/or second samples of cold atoms trapped in magneto-optical traps are shown in FIGS. 3-8.

Accordingly, as described above, the two magneto-optical traps may be created with only the single generated laser beam having the first detuning and the two reflectors. No complicated optical setups are necessary to generate each of the twelve separate beams; rather, the reflection of the single beam off of the first and second reflectors serves to generate all the necessary beams for the first and second magneto-optical traps without the need for any additional optics.

FIG. 10 shows a flow chart representing a method for measuring a gravity gradient in accordance with one or more embodiments of the invention. More specifically, FIG. 10 shows a flow chart describing a cold atom interferometry method to be used for measuring a gravity gradient in accordance with one or more embodiments of the invention. FIG. 10 presupposes that at least two samples of cold atoms have been previously prepared, e.g., in accordance with the method described above in reference to FIG. 9 or in accordance with other known trapping and cooling techniques. In step 1001, the laser beam generated in step 901 is switched off to release the first and second cold atom samples from the first and second cold atom traps, respectively. Accordingly, due to the lack of a trapping force (or potential), the samples of cold atoms fall freely under the force of gravity, i.e., the samples of cold atoms undergo free-fall. In step 1003, the frequency of the laser beam is changed to a second detuning. Using FIG. 12 as an example, the detuning of the laser beam is changed to $\Delta_{Raman}$. In addition, the two frequencies present in the laser beam are phase locked to ensure that the frequency difference between the two laser beams is stabilized to $\omega_{hyperfine}$, the splitting between the two hyperfine ground states of the trapped cold atom. Accordingly, the laser beam may be used to drive two-photon Raman transitions between the two ground states $|1\rangle$ and $|2\rangle$. For example, the action of the laser beam in this Raman configuration allows for the coherent population transfer of atoms between the $|1\rangle$ and $|2\rangle$ states and also allows for the creation of atoms in a coherent superposition of the states $|1\rangle$ and $|2\rangle$, as is known in the art.

In step 1005, the laser beam is pulsed to generate a first and a second cold atom interferometer from the first and second samples of cold atoms. For example, the laser beam may be pulsed three times in succession, with the duration of each pulse tuned so as to drive a ($\pi/2$-$\pi$-$\pi/2$) pulse sequence. One of ordinary skill will appreciate that many different types of pulse sequences may be used to generate cold atom interferometers of varying geometry without departing from the scope of the present disclosure. For example, B. Canuel et al., "Six Axis Inertial Sensor Using Cold-Atom Interferometry" Physical Review Letters 97, 010402 (2006) discloses the use of a four-pulse sequence of ($\pi/2$-$\pi$-$\pi$-$\pi/2$) in order to create what is known as a "butterfly" interferometer.

After the interferometer pulse sequence is finished, the frequency of the laser beam is changed to a third detuning $\Delta_{fluor}$ in preparation for a ground state population measurement. For example, using FIG. 12 as an example, the third detuning may be a detuning that is resonant, or nearly resonant with, the $5^2S_{1/2}F=2 \rightarrow 5^2P_{3/2}F'=3$ cycling transition. In other words, $\Delta_{fluor} \approx 0$. In step 1009, the laser beam is pulsed to obtain a first population measurement from the first atom interferometer and to obtain a second population measurement from the second atom interferometer. As is known in the art, the ground state populations, i.e., the number of atoms in the $|1\rangle$ state, the $|2\rangle$ state or both is determined based on the fluorescence of the cold atom sample in response to the laser beam pulse. One of ordinary skill will appreciate that other methods of population measurement may be deployed without departing from the scope of the present disclosure including, e.g., absorption imaging, phase contrast imaging, or any other known method of imaging ultra-cold atoms.

In step 1011, a first local acceleration is computed based upon the population measured in the first population measurement. As described above, the number of atoms present in the ground state depends on the phase difference between the atoms in the interferometer legs and may be found using the relation $P=[1-\cos \Delta\phi(r)]/2$, where P is the probability of an atom to be in the ground state as a function of the acceleration induced phase shift. For atoms accelerating at a rate g(r), $\Delta\phi(r)=(\vec{K}_1-\vec{K}_2) \cdot \vec{g}(r)T^2$, where T is the time between successive Raman beam pulses, and $\vec{K}_1$ and $\vec{K}_2$ are the propagation vectors for the Raman beams of frequency $\omega_1$ and $\omega_2$, respectively. Thus, by measuring the ground state populations, the phase difference $\Delta\phi(r)$, and thereby the projection of the local acceleration, or equivalently the projection of g(r), on the measurement axis may be determined. One of ordinary skill will appreciate that other methods for computing the phase difference from the population measurement may be used without departing from the scope of the present disclosure. Accordingly, the formula laid out above serve as merely one example.

In step 1013, a second local acceleration is computed based on the ground state population measurement of the atoms in the second cold atom sample in a manner identical to that described above in step 1011.

In step 1015, the gravity gradient is computed based on the first and second local accelerations. For example, to compute the gravity gradient, the first local acceleration is subtracted from the second local acceleration and this difference is divided by the distance between the two interferometers. In this manner, any acceleration of the interferometer itself, or any noise induced on each acceleration signal, e.g., due to vibrations of the apparatus itself, will be subtracted out as common mode noise.

One of ordinary skill will appreciate that any known data control or acquisition system may be used to acquire the population measurements and to perform the calibration, control, and computations necessary to make the gravity gradient measurement. Typical control/acquisition systems will include several analog and/or digital input and output lines one or more processors and associated memory. For example as described above in reference to FIG. 2, the fluorescence measurements may be acquired by photodetectors. These photodetectors are any detector capable of converting light signals into electrical signals. Thus, the photodetectors may be electrically connected to the control/acquisition system and configured to transmit the raw fluorescence electrical signal to the control/acquisition system where this raw fluorescence electrical signal may be processed and converted to a local acceleration value as is known in the art.

FIG. 11 shows a flow chart describing a method for measuring a gravity gradient in accordance with one or more embodiments of the invention. More specifically, FIG. 11 shows flow chart describing a cold atom trapping method for use in a method for measuring a gravity gradient in accordance with one or more embodiments of the invention.

In step 1101, a laser beam having a first detuning is generated in a manner similar to that described above in reference to FIG. 9. In step 1103, a first portion of the laser beam is reflected from a first reflector to generate a plurality of first trapping laser beams in a manner similar to that described above in reference to FIG. 9. In step 1105, a second portion of the laser beam is transmitted through a central hole arranged in the first reflector in a manner similar to that described above in reference to FIG. 9. In step 1107, the second portion of the laser beam is reflected from a second reflector to generate a plurality of second trapping laser beams in a manner similar to that described above in reference to FIG. 9. In step 1109, a third portion of the laser beam is transmitted through a central hole arranged in the second reflector. Examples of reflectors which allow for the transmission of the third portion of the laser beam are shown, e.g., in FIGS. 4 and 8. The third portion is transmitted in a manner that is similar to the manner in which the second portion is transmitted through the first reflector.

In step 1111, the third portion of the laser beam is reflected from a third reflector, to generate a retro-reflected trapping laser beam. In accordance with one or more embodiments, the third reflector may be a planar retro-reflecting mirror which serves to reflect the third portion of the laser beam back through the holes in the first and second reflectors. An example of such a reflector is shown in FIG. 8. In addition, in accordance with one or more embodiments, the third reflector may be a truncated pyramidal reflector so as to generate a plurality of third trapping laser beams in addition to the retro-reflected laser beam. Accordingly, in an embodiment that employs a third reflector that is truncated pyramidal in shape, a third cold atom trap may be formed in a manner that is similar to the first and second cold atom traps. Such an arrangement is shown in FIG. 4.

Returning to FIG. 11, in step 1113, a first cold atom trap is formed using the plurality of first trapping laser beams in combination with the retro-reflected laser beam. Likewise, in step 1115, a second cold atom trap is formed using the plurality of second trapping laser beams in combination with the retro-reflected laser beam. Optionally, if the third reflector is of a truncated pyramidal shape, a third cold atom trap is formed using the plurality of third trapping laser beams in combination with the retro-reflected laser beam. In accordance with one or more embodiments, any number of cold atom traps may be formed in the above manner without departing from the scope of the present disclosure.

In step 1117, a first and second sample of cold atoms is trapped in the first and second cold atom traps, respectively. Optionally, if the third reflector is of truncated pyramidal type, a third sample of cold atoms may also be trapped in the third cold atom trap.

Furthermore, in accordance with one or more embodiments that include at least three cold atom traps, the systems and method described above may be adapted in the following manner to compute the change in the gravity gradient as a function of distance, in other words, the second derivative of the gravitational field, referred to herein as the gravity curvature. For example, in a manner similar to that described above in reference to FIG. 10, the local acceleration at each interferometer may be computed. For example, a first local acceleration may be computed using atom interferometry on the first sample of cold atoms trapped by the first reflector, a second local acceleration may be computed using atom interferometry on the second sample of cold atoms trapped by the second reflector, and a third local acceleration may be computed using atom interferometry on the third sample atoms trapped by the third reflector. The gravity curvature may then be computed based on the first, second, and third local accelerations by computing a gradient difference. The gradient difference is computed by subtracting a difference between the first local acceleration and the second local acceleration from a difference between the first second local acceleration and the third local acceleration. To obtain the gravity curvature, the gradient difference is divided by the separation between the first and third interferometers. More explicitly, if the first gravity gradient between the first and second cold atom samples (separated by a distance $\delta z_1$) is $$\frac{\partial g_{1z}}{\partial z} = \frac{g_{z2} - g_{z1}}{\delta z_1}$$

and the second gravity gradient between the second and third cold atom samples (separated by a distance $\delta z_2$) is $$\frac{\partial g_{2z}}{\partial z} = \frac{g_{z3} - g_{z2}}{\delta z_2},$$

the gravity curvature is given by $$\frac{\partial^2 g_{1z}}{\partial z^2} = \frac{1}{\partial z_1 + \partial z_2}\left(\frac{\partial g_{2z}}{\partial z} - \frac{\partial g_{1z}}{\partial z}\right).$$

One of ordinary skill having the benefit of this disclosure will appreciate that higher order derivatives of the gravitational field may also be measured in a similar manner by a device having any number of cold atom interferometers without departing from the scope of the present disclosure. Furthermore, having more that two cold atom interferometers also allows for several different gravity gradient measurements to be made, e.g., between the first and second cold atom samples, between the first and third cold atom samples, or between the second and third cold atom samples.

In accordance with the embodiments described above, a cold atom gravity gradiometer is disclosed herein that performs multiple (i.e., two or more) relative acceleration (or local gravity) measurements using a single laser beam. More precisely, in accordance with one or more embodiments, the same laser beam may be used for the atom traps, the atom interferometers, and the population measurements. Accordingly, the complexity of the optical system may be greatly reduced. Likewise, the difficulty of optical alignment and complexity of the manufacturing process are both dramatically simplified because only a few optics are needed to be precisely aligned, namely, the reflectors which serve to create the magneto-optical traps and the retro-reflector which serves to created the retro-reflected Raman beam (as described above, the retro-reflector may, or may not, be part of, or integrated into, a pyramidal reflector depending on the embodiment deployed). Furthermore, due to the use of a series of pyramidal reflectors which also possess a central hole for the laser beam to pass through, all the beams for each successive magneto-optical trap are generated from a single laser beam. Stated another way, the generation 6N trapping beams from a single laser beam requires only N pyramidal reflectors. Furthermore, because a portion of the laser beam passes through each successive hole in each successive reflector, the same laser beam may be used for the Raman beam, the trapping laser beam, and the fluorescence detection beam.

Because the system requires only one laser beam, the design of the vacuum chamber that houses the reflectors is also simplified. At a minimum, this chamber requires only one viewport for receiving the laser beam and optionally additional viewports for fluorescence acquisition. Furthermore, all atom traps may be housed within the same vacuum chamber thereby reducing the complexity of the design of the chamber in addition to the design of the vacuum system that is required to pump out the chamber.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A cold atom gravity gradiometer system comprising:
   a laser source that generates a laser beam that propagates along a propagation direction;
   a first reflector that reflects a first portion of the laser beam and transmits a second portion of the laser beam; and
   a second reflector spatially separated from the first reflector along the propagation direction, wherein the second reflector reflects the second portion of the laser beam;
   wherein the first reflector comprises:
   a first reflecting surface arranged to reflect the first portion of the laser beam to generate a plurality of first trapping laser beams for trapping a first sample of cold atoms; and
   a central hole arranged within the first reflector that allows the second portion of the laser beam to transmit through the first reflector.

2. The cold atom gravity gradiometer system of claim 1, wherein the second reflector comprises a second reflecting surface arranged to reflect the second portion of the laser beam to generate a plurality of second trapping laser beams for trapping a second sample of cold atoms.

3. The cold atom gravity gradiometer system of claim 2, wherein the second reflecting surface comprises a surface that is arranged to retro-reflect the second portion of the laser beam back through the central hole of the first reflector.

4. The cold atom gravity gradiometer system of claim 2, further comprising:
   a third reflector that retro-reflects a third portion of the laser beam back through the first and second reflectors; and
   wherein the first sample of cold atoms is trapped by a combination of the plurality of first trapping laser beams and the retro-reflected third portion of the laser beam,
   wherein the second sample of cold atoms is trapped by a combination of the plurality of second trapping laser beams and the retro-reflected third portion of the laser beam.

5. The cold atom gravity gradiometer system of claim 2, further comprising:
   a Raman laser source for generating a Raman Laser beam, for driving Raman transitions in the first and second samples of cold atoms,
   wherein the Raman laser beam propagates in a local acceleration measurement direction and passes through the central hole of the first reflector,
   wherein the second reflector is spatially separated from the first reflector along the local acceleration measurement direction, and
   wherein the second reflecting surface comprises a reflecting surface arranged to retro-reflect the Raman laser beam back through the central hole of the first reflector.

6. The system of claim 5, wherein the Raman laser source is the laser source that generates the laser beam that propagates along the propagation direction, with a modified frequency for driving Raman transitions in the samples of cold atoms.

7. The cold atom gravity gradiometer system of claim 2, further comprising:
   a third reflector that is spatially separated from both the first and the second reflectors along the laser beam propagation direction,
   wherein the third reflector comprises a third reflecting surface that reflects a third portion of the laser beam that has passed through a central hole in the second reflector,
   wherein the third reflecting surface reflects the third portion of the laser beam to generate a plurality of third trapping laser beams for trapping a third sample of cold atoms, and,
   wherein the third reflecting surface retro-reflects the third portion of the laser beam back through the central holes of the first and second reflectors.

8. The cold atom gravity gradiometer system of claim 7,
   wherein the first sample of cold atoms is trapped by a combination of the plurality of first trapping laser beams and the retro-reflected third portion of the laser beam,
   wherein the second sample of cold atoms is trapped by a combination of the plurality of second trapping laser beams and the retro-reflected third portion of the laser beam, and
   wherein the third sample of cold atoms is trapped by a combination of the plurality of third trapping laser beams and the retro-reflected third portion of the laser beam.

9. The cold atom gravity gradiometer system of claim 3,
   wherein the first sample of cold atoms is trapped by a combination of the plurality of first trapping laser beams and the retro-reflected second portion of the laser beam,
   wherein the second sample of cold atoms is trapped by a combination of the plurality of second trapping laser beams and the retro-reflected second portion of the laser beam.

10. The cold atom gravity gradiometer system of claim 1, further comprising a third reflector that is spatially separated from the first reflector along a direction substantially perpendicular to a direction defined by a direction pointing away from the first reflector and toward the second reflector.

11. A method for measuring a gravity gradient comprising:
    generating a laser beam having a frequency having a first detuning;
    reflecting, from a first reflector, a first portion of the laser beam to generate a plurality of first trapping laser beams;
    transmitting a second portion of the laser beam through a central hole arranged in the first reflector; and
    reflecting, from a second reflector, the second portion of the laser beam to generate a plurality of second trapping laser beams and a retro-reflected trapping laser beam;
    forming a first cold atom trap using the plurality of first trapping laser beams in combination with the retro-reflected trapping laser beam;
    forming a second cold atom trap using the plurality of second trapping laser beams in combination with the retro-reflected trapping laser beam;

trapping a first sample and a second sample of cold atoms in the first and second cold atom traps, respectively.

12. The method of claim 11, further comprising:
switching off the laser beam to release the first and second cold atom samples;
changing the frequency of the laser beam to a second detuning;
pulsing the laser beam to generate a first and a second cold atom interferometer from the first and second sample of cold atoms;
changing the frequency of the laser beam to a third detuning;
pulsing the laser beam to obtain a first population measurement from the first atom interferometer and to obtain a second population measurement from the second atom interferometer;
computing a first local acceleration based on the first population measurement;
computing a second local acceleration based on the second population measurement; and
computing the gravity gradient based on the first and second local accelerations.

13. The method of claim 12, wherein computing the gravity gradient based on the first and second local accelerations comprises subtracting the first local acceleration from the second local acceleration to generate an acceleration difference.

14. The method of claim 13, further comprising dividing the acceleration difference by a separation between the first interferometer and the second interferometer.

15. The method of claim 12, wherein pulsing the laser beam comprises pulsing the laser beam in $\pi/2$-$\pi$-$\pi/2$ pulse sequence.

16. A method for measuring a gravity gradient comprising:
generating a laser beam having a first detuning;
reflecting, from a first reflector, a first portion of the laser beam to generate a plurality of first trapping laser beams;
transmitting a second portion of the laser beam through a central hole arranged in the first reflector; and
reflecting, from a second reflector, the second portion of the laser beam to generate a plurality of second trapping laser beams;
transmitting a third portion of the laser beam through a central hole arranged in the second reflector;
reflecting, from a third reflector, the third portion of the laser beam to generate a retro-reflected trapping laser beam;
forming a first cold atom trap using the plurality of first trapping laser beams in combination with the retro-reflected laser beam;
forming a second cold atom trap using the plurality of second trapping laser beams in combination with the retro-reflected laser beam; and
trapping a first and second sample of cold atoms in the first and second cold atom traps, respectively.

17. The method of claim 16, further comprising:
reflecting, from the third reflector, the third portion of the laser beam to generate a third plurality of trapping laser beams;
forming a third cold atom trap using the plurality of third trapping laser beams in combination with the retro-reflected laser beam; and
trapping a third sample of cold atoms in the third atom trap.

18. The method of claim 17, further comprising:
switching off the laser beam to release the first, second, and third cold atom samples;
changing the frequency of the laser beam to a second detuning;
pulsing the laser beam to generate a first, second, and third cold atom interferometer from the first, second, and third samples of cold atoms, respectively;
changing the frequency of the laser beam to a third detuning;
pulsing the laser beam to obtain a first, second, and third population measurement from the first, second, and third atom interferometers, respectively;
computing a first, second, and third local acceleration based on the first, second, and third population measurements, respectively; and
computing the gravity curvature based on the first, second, and third local accelerations.

19. The method of claim 18, wherein pulsing the laser beam having the second detuning comprises pulsing the laser beam in a $\pi/2$-$\pi$-$\pi/2$ pulse sequence.

20. The method of claim 19, wherein computing the gravity curvature based on the first, second, and third local accelerations comprises computing a gradient difference by subtracting a difference between the first local acceleration and the second local acceleration from a difference between the first second local acceleration and the third local acceleration.

21. The method of claim 20, wherein computing the gravity curvature includes dividing the gradient difference by a separation between the first and third interferometers.

22. A cold atom gravity gradiometer system comprising:
a laser source for generating a laser beam that propagates along a propagation direction;
a first reflector that reflects a first portion of the laser beam;
a second reflector that reflects a second portion of the laser beam, wherein the second reflector is spatially separated from the first reflector along a gradient measurement direction that substantially perpendicular to the propagation direction;
wherein the first reflector comprises a first reflecting surface arranged to reflect a first portion of the laser beam to generate a plurality of first trapping laser beams for trapping a first sample of cold atoms; and
wherein the second reflector comprises a second reflecting surface arranged to reflect the second portion of the laser beam to generate a plurality of second trapping laser beams for trapping a second sample of cold atoms.

23. The system of claim 22, wherein the propagation direction is parallel to a local gravity gradient direction.

* * * * *